United States Patent
Gaben

(10) Patent No.: US 11,967,694 B2
(45) Date of Patent: Apr. 23, 2024

(54) POROUS ELECTRODES FOR ELECTROCHEMICAL DEVICES

(71) Applicant: I-TEN, Dardilly (FR)

(72) Inventor: Fabien Gaben, Dardilly (FR)

(73) Assignee: I-TEN, Dardilly (FR)

(*) Notice: Subject to any disclaimer, the term of this patent is extended or adjusted under 35 U.S.C. 154(b) by 183 days.

(21) Appl. No.: 17/049,977

(22) PCT Filed: May 6, 2019

(86) PCT No.: PCT/FR2019/051028
§ 371 (c)(1),
(2) Date: Oct. 23, 2020

(87) PCT Pub. No.: WO2019/215407
PCT Pub. Date: Nov. 14, 2019

(65) Prior Publication Data
US 2021/0074991 A1 Mar. 11, 2021

(30) Foreign Application Priority Data
May 7, 2018 (FR) .................................. 1853920

(51) Int. Cl.
*H01M 4/04* (2006.01)
*H01G 11/24* (2013.01)
(Continued)

(52) U.S. Cl.
CPC .......... *H01M 4/0404* (2013.01); *H01G 11/24* (2013.01); *H01G 11/30* (2013.01);
(Continued)

(58) Field of Classification Search
CPC .. H01M 4/0404; H01M 4/0428; H01M 4/043; H01M 4/0457; H01M 4/131;
(Continued)

(56) References Cited

U.S. PATENT DOCUMENTS

| 2,312,232 A | 2/1943 | Bol |
| 3,959,022 A | 5/1976 | DeJonghe et al. |

(Continued)

FOREIGN PATENT DOCUMENTS

| BE | 854762 | 11/1977 |
| CN | 1560948 A | 1/2005 |

(Continued)

OTHER PUBLICATIONS

Richards W.D. et al., "Interface Stability in Solid-State Batteries", Chemistry of Materials (2016) vol. 28, pp. 266-273.
(Continued)

*Primary Examiner* — Brian R Ohara
*Assistant Examiner* — Emily Elizabeth Freeman
(74) *Attorney, Agent, or Firm* — Gearhart Law, LLC; David Postolski

(57) ABSTRACT

The invention relates to methods for producing a porous electrode, said electrode comprising a layer deposited on a substrate, being binder-free and having a porosity of more than 30 and less than 50 volume %, and pores having an average diameter of less than 50 nm, said method comprising:
(a) providing a colloidal suspension containing aggregates or agglomerates of nanoparticles of at least one material P having an average primary diameter of 80 nm or less, said aggregates or agglomerates having an average diameter comprised between 80 nm and 300 nm,
(b) providing a substrate,
(c) depositing a mesoporous, electrode layer on the substrate by electrophoresis, ink-jet, doctor blade, roll coating, curtain coating or dip-coating, from the colloidal suspension provided in step (a);

(Continued)

(d) drying said layer, preferably in an air flow, and
(e) consolidating the porous, preferably mesoporous electrode layer obtained in step (d) by pressing and/or heating.

17 Claims, 2 Drawing Sheets

(51) Int. Cl.
| | | |
|---|---|---|
| *H01G 11/30* | (2013.01) | |
| *H01M 4/02* | (2006.01) | |
| *H01M 4/131* | (2010.01) | |
| *H01M 4/136* | (2010.01) | |
| *H01M 4/1391* | (2010.01) | |
| *H01M 4/1397* | (2010.01) | |
| *H01M 4/36* | (2006.01) | |
| *H01M 4/485* | (2010.01) | |
| *H01M 4/505* | (2010.01) | |
| *H01M 4/525* | (2010.01) | |
| *H01M 4/58* | (2010.01) | |
| *H01M 10/0525* | (2010.01) | |
| *H01M 10/0585* | (2010.01) | |

(52) U.S. Cl.
CPC ......... *H01M 4/0428* (2013.01); *H01M 4/043* (2013.01); *H01M 4/0457* (2013.01); *H01M 4/131* (2013.01); *H01M 4/136* (2013.01); *H01M 4/1391* (2013.01); *H01M 4/1397* (2013.01); *H01M 4/366* (2013.01); *H01M 4/485* (2013.01); *H01M 4/505* (2013.01); *H01M 4/525* (2013.01); *H01M 4/5825* (2013.01); *H01M 10/0525* (2013.01); *H01M 10/0585* (2013.01); *H01M 2004/021* (2013.01)

(58) Field of Classification Search
CPC .. H01M 4/136; H01M 4/1391; H01M 4/1397; H01M 4/366; H01M 4/485; H01M 4/505; H01M 4/525; H01M 4/5825; H01M 10/0525; H01M 10/0585; H01M 2004/021; H01G 11/24; H01G 11/30
See application file for complete search history.

(56) References Cited

U.S. PATENT DOCUMENTS

| | | | |
|---|---|---|---|
| 5,006,248 A | 4/1991 | Anderson et al. | |
| 5,518,839 A | 5/1996 | Olsen | |
| 5,561,004 A * | 10/1996 | Bates | H01M 50/117 429/185 |
| 5,636,437 A * | 6/1997 | Kaschmitter | H01M 4/587 429/105 |
| 5,846,664 A | 12/1998 | Third et al. | |
| 6,159,637 A | 12/2000 | Shizuka et al. | |
| 6,242,132 B1 | 6/2001 | Neudecker et al. | |
| 6,251,473 B1 | 6/2001 | Wang et al. | |
| 6,607,645 B1 | 8/2003 | Sarkar | |
| 6,664,006 B1 | 12/2003 | Munshi | |
| 6,841,497 B1 | 1/2005 | Krell et al. | |
| 6,887,361 B1 | 5/2005 | Visco et al. | |
| 7,285,334 B1 | 10/2007 | Yamashita et al. | |
| 7,473,088 B2 | 1/2009 | Ho et al. | |
| 7,662,265 B2 | 2/2010 | Chiang et al. | |
| 7,695,865 B2 | 4/2010 | Saito et al. | |
| 7,828,619 B1 | 11/2010 | Yeh | |
| 7,829,225 B2 | 11/2010 | Salot et al. | |
| 8,877,388 B1 | 11/2014 | Ihlefeld et al. | |
| 9,437,855 B2 * | 9/2016 | Prochazka, Jr. | H01M 10/0422 |
| 9,515,319 B2 | 12/2016 | Harada et al. | |
| 10,050,311 B2 * | 8/2018 | Kwon | H01M 4/661 |
| 2001/0041294 A1 | 11/2001 | Chu et al. | |
| 2002/0034688 A1 | 3/2002 | Chu et al. | |
| 2002/0071989 A1 | 6/2002 | Verma et al. | |
| 2002/0172871 A1 | 11/2002 | Schucker | |
| 2003/0003237 A1 | 1/2003 | Seabaugh et al. | |
| 2003/0012952 A1 | 1/2003 | Yadav et al. | |
| 2003/0064292 A1 | 4/2003 | Neudecker et al. | |
| 2003/0102222 A1 | 6/2003 | Zhou et al. | |
| 2003/0134176 A1 | 7/2003 | Sarkar | |
| 2004/0011433 A1 | 1/2004 | Shiozaki et al. | |
| 2004/0020916 A1 | 2/2004 | Mangina | |
| 2004/0126653 A1 | 7/2004 | Visco et al. | |
| 2004/0157121 A1 | 8/2004 | Watanabe et al. | |
| 2004/0166417 A1 | 8/2004 | Nishio et al. | |
| 2004/0185336 A1 | 9/2004 | Ito et al. | |
| 2004/0209163 A1 | 10/2004 | Watanabe et al. | |
| 2004/0214085 A1 | 10/2004 | Sheem et al. | |
| 2004/0222098 A1 | 11/2004 | Clasen et al. | |
| 2004/0248011 A1 | 12/2004 | Asao et al. | |
| 2004/0253512 A1 | 12/2004 | Watanabe et al. | |
| 2004/0259713 A1 | 12/2004 | Frey | |
| 2005/0132562 A1 | 6/2005 | Saito et al. | |
| 2005/0181268 A1 * | 8/2005 | Ohya | H01M 4/921 429/492 |
| 2005/0272214 A1 | 12/2005 | Chiang et al. | |
| 2005/0284320 A1 | 12/2005 | Sakuarai et al. | |
| 2006/0198917 A1 | 9/2006 | Ho et al. | |
| 2007/0015061 A1 | 1/2007 | Klaassen | |
| 2007/0018434 A1 | 1/2007 | Hayashi | |
| 2007/0048611 A1 | 3/2007 | Yamamoto et al. | |
| 2007/0184345 A1 | 8/2007 | Neudecker et al. | |
| 2008/0226986 A1 | 9/2008 | Nakahara et al. | |
| 2008/0286651 A1 | 11/2008 | Neudecker et al. | |
| 2008/0290022 A1 | 11/2008 | Sanchez et al. | |
| 2009/0053589 A1 | 2/2009 | Obrovac et al. | |
| 2009/0104510 A1 * | 4/2009 | Fulop | H02J 7/00 429/50 |
| 2009/0114275 A1 | 5/2009 | Zaban et al. | |
| 2009/0162755 A1 | 6/2009 | Neudecker | |
| 2009/0202899 A1 | 8/2009 | Pyszczek | |
| 2009/0214957 A1 | 8/2009 | Okada et al. | |
| 2010/0035157 A1 | 2/2010 | Nakamura | |
| 2010/0040948 A1 | 2/2010 | Takano et al. | |
| 2010/0068623 A1 * | 3/2010 | Braun | H01M 4/131 427/126.3 |
| 2010/0104682 A1 | 4/2010 | Ando et al. | |
| 2010/0216032 A1 | 8/2010 | Baba et al. | |
| 2010/0227209 A1 | 9/2010 | Kim | |
| 2010/0302704 A1 | 12/2010 | Ogawa et al. | |
| 2011/0017152 A1 | 1/2011 | Min | |
| 2011/0045351 A1 | 2/2011 | Peled et al. | |
| 2011/0076550 A1 | 3/2011 | Liang et al. | |
| 2011/0100532 A1 | 5/2011 | Lee et al. | |
| 2011/0104571 A1 | 5/2011 | Zhamu et al. | |
| 2011/0123866 A1 | 5/2011 | Pan et al. | |
| 2011/0171528 A1 | 7/2011 | Oladeji | |
| 2011/0227000 A1 | 9/2011 | Ruoff et al. | |
| 2011/0240112 A1 | 10/2011 | Ahn et al. | |
| 2011/0269025 A1 * | 11/2011 | Sun | H01M 4/48 252/182.1 |
| 2011/0310530 A1 * | 12/2011 | Laor | H05K 1/162 361/524 |
| 2012/0045685 A1 | 2/2012 | Seki et al. | |
| 2012/0073642 A1 | 3/2012 | Chen et al. | |
| 2012/0202120 A1 | 8/2012 | Kim et al. | |
| 2012/0211365 A1 | 8/2012 | Joung et al. | |
| 2012/0216394 A1 | 8/2012 | Kitaura et al. | |
| 2012/0315530 A1 * | 12/2012 | Kageura | H01M 4/505 429/211 |
| 2013/0127335 A1 | 5/2013 | Chang et al. | |
| 2013/0209893 A1 | 8/2013 | Archer et al. | |
| 2013/0244102 A1 | 9/2013 | Golodnitsky et al. | |
| 2014/0057162 A1 | 2/2014 | Schneider et al. | |
| 2014/0170524 A1 | 6/2014 | Chiang et al. | |
| 2014/0178759 A1 | 6/2014 | Worsley et al. | |
| 2014/0308576 A1 | 10/2014 | Gaben et al. | |
| 2014/0319974 A1 | 10/2014 | Feichtinger et al. | |
| 2014/0370365 A1 | 12/2014 | Kubota et al. | |
| 2015/0099190 A1 | 4/2015 | Holme et al. | |

(56) References Cited

U.S. PATENT DOCUMENTS

| | | | | |
|---|---|---|---|---|
| 2015/0364790 | A1* | 12/2015 | Yonehara | H01M 4/622 429/316 |
| 2016/0013513 | A1 | 1/2016 | Gaben | |
| 2016/0141716 | A1* | 5/2016 | Ito | H01M 10/0562 429/162 |
| 2016/0172682 | A1 | 6/2016 | Martin et al. | |
| 2016/0183327 | A1 | 6/2016 | Engel et al. | |
| 2017/0162911 | A1 | 6/2017 | Gaben | |
| 2017/0187039 | A1* | 6/2017 | Sun | C01G 53/50 |
| 2018/0108904 | A1 | 4/2018 | Gaben | |
| 2018/0269442 | A1* | 9/2018 | Hsieh | H01M 4/5825 |
| 2018/0375138 | A1* | 12/2018 | Nakatsuka | H01M 8/04731 |
| 2019/0123391 | A1* | 4/2019 | Mizutani | H01M 10/4235 |
| 2019/0181420 | A1* | 6/2019 | Senoue | H01M 4/386 |
| 2020/0343554 | A1* | 10/2020 | Oshima | H01M 4/587 |

FOREIGN PATENT DOCUMENTS

| | | |
|---|---|---|
| CN | 1945881 A | 4/2007 |
| CN | 101076914 A | 11/2007 |
| CN | 101174698 B | 5/2008 |
| CN | 101310400 B | 11/2008 |
| CN | 101365741 A | 2/2009 |
| CN | 101388470 B | 3/2009 |
| CN | 101468370 B | 7/2009 |
| CN | 101675553 B | 3/2010 |
| CN | 101733994 B | 6/2010 |
| CN | 101758638 A | 6/2010 |
| CN | 102237320 A | 11/2011 |
| CN | 102859759 B | 1/2013 |
| CN | 103158252 B | 6/2013 |
| CN | 103568356 A | 2/2014 |
| CN | 105552254 A | 5/2016 |
| DE | 202006008399 | 8/2006 |
| EP | 453796 B1 | 10/1991 |
| EP | 523840 B1 | 1/1993 |
| EP | 1049188 B1 | 11/2000 |
| EP | 1295968 B1 | 3/2003 |
| EP | 1424743 B1 | 6/2004 |
| EP | 1475462 A3 | 11/2004 |
| EP | 1926164 A1 | 5/2008 |
| EP | 2037527 B1 | 3/2009 |
| EP | 2251188 A2 | 11/2010 |
| EP | 2432065 A1 | 3/2012 |
| EP | 2868770 B1 | 5/2015 |
| EP | 2939295 B1 | 11/2015 |
| FR | 2880198 B1 | 6/2006 |
| FR | 2893623 A1 | 5/2007 |
| FR | 2956523 A1 | 8/2011 |
| FR | 2981952 B1 | 5/2013 |
| FR | 2982082 B1 | 5/2013 |
| FR | 2982083 A1 | 5/2013 |
| FR | 2982084 B1 | 5/2013 |
| FR | 3002695 B1 | 8/2014 |
| FR | 3014425 A1 | 6/2015 |
| FR | 3023302 A1 | 1/2016 |
| JP | H07501039 A | 2/1995 |
| JP | 10102294 A | 4/1998 |
| JP | 11149820 A | 6/1999 |
| JP | 2000343300 A | 12/2000 |
| JP | 2002042790 A | 2/2002 |
| JP | 2002042792 A | 2/2002 |
| JP | 2002203562 A | 7/2002 |
| JP | 2003109873 A * | 4/2003 |
| JP | 2003532609 A | 11/2003 |
| JP | 2004185862 A | 7/2004 |
| JP | 2005085716 A | 3/2005 |
| JP | 2006073487 A | 3/2006 |
| JP | 2006136916 A | 6/2006 |
| JP | 2007005279 A | 1/2007 |
| JP | 2007080812 A | 3/2007 |
| JP | 2007123081 A | 5/2007 |
| JP | 2007123192 A | 5/2007 |
| JP | 2007266327 A | 10/2007 |
| JP | 2008171588 A | 7/2008 |
| JP | 2008246392 A | 10/2008 |
| JP | 2009516359 A | 4/2009 |
| JP | 2009176541 A | 8/2009 |
| JP | 2009181920 A | 8/2009 |
| JP | 2009193802 A | 8/2009 |
| JP | 2009193888 A | 8/2009 |
| JP | 2009544141 A | 12/2009 |
| JP | 2010029791 A | 2/2010 |
| JP | 2010080422 A | 4/2010 |
| JP | 2010102841 A | 5/2010 |
| JP | 2010126735 A | 6/2010 |
| JP | 4501247 B2 | 7/2010 |
| JP | 2010170854 A | 8/2010 |
| JP | 2010170972 A | 8/2010 |
| JP | 2010186626 A | 8/2010 |
| JP | 2010528424 A | 8/2010 |
| JP | 2010205449 A | 9/2010 |
| JP | 2010212161 A | 9/2010 |
| JP | 2010278373 A | 12/2010 |
| JP | 2011511399 A | 4/2011 |
| JP | 2011126746 A | 6/2011 |
| JP | 2011181331 A | 9/2011 |
| JP | 2011191343 A | 9/2011 |
| JP | 2012014892 A | 1/2012 |
| JP | 2012238545 A | 12/2012 |
| JP | 2014022321 A | 2/2014 |
| JP | 5576636 B2 | 8/2014 |
| KR | 10-0580442 B1 | 5/2006 |
| KR | 10-2007-0017062 A | 2/2007 |
| KR | 20070094156 A | 9/2007 |
| KR | 10-2008-0070828 A | 7/2008 |
| KR | 10-2013-0014531 A | 2/2013 |
| SU | 498666 A1 | 1/1976 |
| WO | 2000/069790 A2 | 11/2000 |
| WO | 2001/070392 A1 | 9/2001 |
| WO | 2002/003430 A2 | 1/2002 |
| WO | 2002/075826 A2 | 9/2002 |
| WO | 2004/051769 A2 | 6/2004 |
| WO | 2006/082846 A1 | 8/2006 |
| WO | 2007/061928 A3 | 5/2007 |
| WO | 2007/086218 A1 | 8/2007 |
| WO | 2008/089110 A1 | 7/2008 |
| WO | 2008/143027 A1 | 11/2008 |
| WO | 2009/048300 A3 | 4/2009 |
| WO | 2009/119358 A1 | 10/2009 |
| WO | 2010/011569 A1 | 1/2010 |
| WO | 2010/076428 A1 | 7/2010 |
| WO | 2010/119443 A1 | 10/2010 |
| WO | 2011/120052 A1 | 9/2011 |
| WO | 2011/128976 A1 | 10/2011 |
| WO | 2012/076950 A1 | 6/2012 |
| WO | 2012/091111 A1 | 7/2012 |
| WO | 2012/101501 A8 | 8/2012 |
| WO | 2013/064773 A1 | 5/2013 |
| WO | 2013/064779 A1 | 5/2013 |
| WO | 2014/102520 A1 | 7/2014 |
| WO | 2014/131997 A2 | 9/2014 |
| WO | 2016/001584 A1 | 1/2016 |
| WO | 2016/025067 A1 | 2/2016 |
| WO | 2016/176491 A1 | 11/2016 |
| WO | 2016/205780 A1 | 12/2016 |
| WO | 2017/131676 A1 | 8/2017 |

OTHER PUBLICATIONS

Ruzmetov D. et al., "Electrolyte Stability Determines Scaling Limits for Solid-State 3DLi Ion Batteries", nanoletters, vol. 12, 2012, pp. 505-511.

Santhanagopalan D. et al., "Interface Limited Lithium Transport in Solid-State Batteries", J.Phys.Chem.Lett., vol. 5, 2014, pp. 298-303.

Shen L. et al., "Hydrogenated $Li_4Ti_5O_{12}$ Nanowire Arrays for High Rate Lithium Ion Batteries", Adv.Mater. (2012) vol. 24, pp. 6502-6506.

Song H. et al., "Anomalous decrease in structural disorder due to charge redistribution inCr-doped $Li_4Ti_5O_{12}$negative-electrode mate-

(56) References Cited

OTHER PUBLICATIONS rials for high-rate Li-ionbatteries", Energy &Environmental Science (2012) vol. 5 pp. 9903-9913.
Takada K. et al., "Progress and prospective of solid-state lithium batteries", Acta Materialia (2013) vol. 61 pp. 759-770.
Taleghani S.T. et al., "A study on the Effect of Porosity and Particle Size Distribution on Li-Ion Battery Performance", J . Electrochem. Soc. (2017) vol. 164 issue11, p. E3179-E3189.
Tatsumisago M. et al., "Preparation of Li3BO3—Li2SO4 glass-ceramic electrolytes for all-oxidelithium batteries", Journal of Power Sources (2014) vol. 270 pp. 603-607.
Tian B. et al., "Niobium doped lithium titanate as a high rate anode material for Li-ion batteries", Electrochimica Acta (2010) vol. 55 pp. 5453-5458.
Trevey, "Advances and development of all-solid-state lithium-ion batteries", mechanical engineering graduate theses & dissertations 17, 2011 by James Edward Trevey, 2011.
Uemura T. et al., "All-solid secondary batteries with sulfide-based thinfilm electrolytes", Journal of power Sources (2013) vol. 240 pp. 510-514.
Wang Q. et al., "A constitutive model of nanocomposite hydrogels with nanoparticle crosslinkers", Journal of the Mechanics and Physics of Solids (2016) vol. 94, pp. 127-147.
Wang Y.Q. et al., "Rutile-TiO2Nanocoating for a High-Rate Li4Ti5O12Anode of aLithium-Ion Battery", JACS (2012) vol. 134, pp. 7874-7879.
Wolfenstine J. et al., "Electrical conductivity and charge compensation in Ta doped Li4Ti5O12", Journal of Power Sources (2008) vol. 180 pp. 582-585.
Wood D.L. et al., "Technical and economic analysis of solvent-based lithium-ion electrode drying with water and NMP", Drying Technology (2018) vol. 36 n°2 pp. 234-244.
Xiao R. et al., "Candidate structures for inorganic lithium solid-state electrolytes identified by high-throughput bond-valence calculations", J. Materiomics (2015) vol. 1 pp. 325-332.
Xie H. et al., "Li1,2Zr1,9Ca0,1(PO4)3, a room temperature Li-ion solid electrolyte", Journal of power sources (2011) vol. 196 pp. 7760-7762.
Yamada H. "Interfaces of solid electrolytes: fundamentals and applications", Journal of the Indian Institute of science (2016) vol. 96 issue 4 pp. 315-323.
Yang C. et al., "Continuous plating/stripping behavior of solid-state lithium metal anode in a 3D ion-conductive framework", PNAS (2018) vol. 115, issue 15, pp. 3770-3775.
Yao X. et al., "All-solid-state lithium batteries with inorganic solid electrolytes: Review of fundamental science", Chin. Phys. B (2016) vol. 25, No. 1 pp. 018802-01 to 018802-14.
Yi T-F. et al., "High rate cycling performance of lanthanum-modified Li4Ti5O12 anode materials for lithium-ion batteries", Journal of Power Sources (2012) vol. 214 pp. 220-226.
Yi T-F. et al., "High-performance Li4Ti5—xVxO12(0≤x≤0.3) as an anode material for secondary lithium-ion battery", Electrochimica Acta (2009) vol. 54 pp. 7464-7470.
Yi T-F. et al., "Improving the high rate performance of Li4Ti5O12through divalent zinc substitution", Journal of Power Sources (2012) vol. 215 pp. 258-265.
You H.C. et al., "Facile preparation of sol-gel-derived ultra thin and high-dielectric zirconia films for capacitor devices", Applied Surface Science (2012) vol. 258 pp. 10084-10088.
You H.C. et al., "Physical Characterization and Electrical Properties of Sol-Gel-Derived Zirconia Films", Journal of The Electrochemical Society (2006) vol. 153 n20 6 pp. F94-F99.
Yu et al., "Mesoporous Li4Ti5O12 Hollow Spheres with Enhanced Lithium Storage Capability", Adv.Mater.(2013) vol. 25, pp. 2296-2300.
Zhang B. et al., "Improved rate capability of carboncoated Li3.9Sn0.1Ti5O12 porous electrodes for Li-ion batteries", Journal of Power Sources (2011) vol. 196, pp. 10692-10697.

Zhang J. et al., Flexible and ion-conducting membrane electrolytes for solid-state lithium batteries : Dispersions of garnet nanoparticles in insulating POE » , NanoEnergy (2016) vol. 28, p. 447-454.
Zhao H. et al., "Structural and electrochemical characteristics of Li4—xAlxTi5O12 as anode material for lithium-ion batteries", Electrochimica Acta (2008) vol. 53 pp. 7079-7083.
Zhao Z. et al., "Synthesis and electrochemical performance of F-doped Li4Ti5O12 for lithium-ion batteries", Electrochimica Acta(2013) vol. 109 pp. 645-650.
Zhu Y.R. et al., "Increased cycling stability of Li4Ti5O12-coated LiMn1.5Ni0.5O4 as cathode material for lithium-ion batteries", Ceramics International (2013) vol. 39 pp. 3087-3094.
Zhu. G-N. et al., "Carbon-coated nano-sized Li4Ti5O12 nanoporous micro-sphere as anode material for high-rate lithium-ion batteries", Energy Environ. Sci., (2011) vol. 4, pp. 4016-4022.
Amatucci G.G et al., "Lithium scandium phosphate-based electrolyes for solid state lithium rechargeable microbatteries", Solid state ionics (1993) vol. 60, pp. 357-365.
Andrzejewska E. et al., "Highly conductive solid polymer-(ionic liquid) electrolytesprepared byin situphotopolymerization", Polimery (2006) vol. 51, pp. 11-12.
Aono H. et al., "Ionic conductivity and sinterability of lithium titanium phosphate system", Solid state ionics (1990) vol. 40/41 pp. 38-42.
Arimura M. et al., "Preparation of barium titanate nanoparticle thin films ny the electrophoretic deposition metho using polyacrylic acid as a charge-compensating agent", Key Engineering Materials (2010) vols. 421-422 pp. 510-513.
Azar M. "Mise en forme et frittage des poudres de céramique nanostructurées : Cas d'une alumine de transition" Thesis (2009).
Balan P. et al., "Effect of nanoparticle addition in hybrid sol-gel silane coating on corrosion resistance of low carbon steel", Advanced Materials Research (2013) vol. 686 pp. 244-249.
Benehkohal N.P. et al., "Enabling Green Fabrication of Li-Ion Battery Electrodes by Electrophoretic Deposition: Growth of Thick Binder-Free Mesoporous TiO 2-Carbon Anode Films", Journal of The Electrochemical Society (2015) vol. 162(11) pp. D3013-D3018.
Bo Z. et al., "Plasma-enhanced chemical vapor deposition synthesisof vertically oriented graphene nanosheets", Nanoscale (2013) vol. 5 p. 5180-5204.
Caballero A. et al., "LiNi0.5Mn1.5O4thick-film electrodes prepared by electrophoreticdeposition for use in high voltage lithium-ion batteries", Journal of Power Sources (2006) vol. 158 pp. 583-590.
Cannarella J. et al., "The Effects of Defects on Localized Plating in Lithium-IonBatteries", Journal of The Electrochemical Society (2015) vol. 162 n°7 pp. A1365-A1373.
Cao C. et al., "Recent advances in inorganic solid electrolytes for lithium batteries", frontiers in Energy Research (2014) vol. 2, article 25 pp. 1-10.
Castro Y. et al., "Silica Sol-Gel Coatings on Metals Produced by EPD", Journal of Sol-Gel Science and Technology (2003) vol. 26, pp. 735-739.
Colin J.F. et al., "A Novel Layered Titanoniobate LiTiNbO5: Topotactic Synthesis andElectrochemistry versus Lithium", Inorganic Chemistry (2006) vol. 45, No. 18, pp. 7217-7223.
Colin J.F. et al., "Lithium Insertion in an Oriented Nanoporous Oxide with a TunnelStructure: Ti2Nb2O9", Chem. Mater. (2008) vol. 20 pp. 1534-1540.
Dutta A., "kinetics of neck formation during nanoparticle sintering : approach of dimensionality reduction", Rev. Adv. Mater. Sci (2014) vol. 39 pp. 25-33.
Ferrari B. et al., "EPD kinetics: A review", Journal of the European Ceramic Society (2010) vol. 30, pp. 1069-1078.
Guo B. et al., "A long-life lithium-ion battery with a highly porous TiNb2O7 anode for large-scale electrical energy storage", Energy & Environmental Science (2014) vol. 7 pp. 2220-2226.
Ha D.H et al., "Binder-Free and Carbon-Free Nanoparticle Batteries: A Method forNanoparticle Electrodes without Polymeric Binders or Carbon Black", Nanoletters (2012) vol. 12, n°10 pp. 5122-5130.
Han J.T. et al., "New Anode Framework for Rechargeable Lithium Batteries", Chemistry of materials, (2011) vol. 23 pp. 2027-2029.

(56) References Cited

OTHER PUBLICATIONS

Huang Y. et al., "Synthesis and electrochemical properties of spinelLi4Ti5O12-xClxanode materials for lithium-ion batteries", J Solid State Electrochem (2012) vol. 16 pp. 2011-2016.
Ise K. et al., "Large lithium storage in highly crystalline TiNb2O7 nanoparticles synthesized by a hydrothermal method as anodes for lithium-ion batteries", Solid State Ionics (2018) vol. 320 pp. 7-15.
Ishihara A. et al., "Titanium-Niobium Oxides as Non-Noble Metal Cathodes for Polymer Electrolyte Fuel Cells" Catalysts (2015), vol. 5, pp. 1289-1303.
Islam S. et al., "Preparation and characterization of crack-free sol-gel basedSiO2-TiO2hybrid nanoparticle film", J Sol-Gel Sci Technol (2013) vol. 68 pp. 162-168.
Ji S. et al., "Preparation and effects of Mg-doping on the electrochemical properties of spinelli4Ti5O12as anode material for lithium ion battery", Materials Chemistry and Physics (2010) vol. 123 pp. 510-515.
Kim H.J. et al., "Controlled prelithiation of silicon monoxide for high performance lithium-ion rechargeable full cells", Nanoletters (2015) vol. 16, n°1, p. 282-288 (XP55558866A).
Kim J.G. et al., "A review of lithium and non-lithium based solid state batteries", Journal of power sources (2015) vol. 282 pp. 299-322.
Kim J.W. et al., "Surface chemistry of LiNi0.5Mn1.5O4particles coated by Al2O3usingatomic layer deposition for lithium-ion batteries", Journal of Power Sources (2015) vol. 274 pp. 1254-1262.
Li B. et al., "Facile synthesis of Li4Ti5O12/C composite with super rate performance", Energy & Environmental Science (2012) vol. 5 pp. 9595-9602.
Li J. et al., "Highly dispersed Pt nanoparticle catalyst prepared by atomic layer deposition", Applied catalysis B : environnmental (2010) vol. 97 pp. 220-226 (XP027057416).
Li X. et al., "Structural and electrochemical performances of Li4Ti5—xZrxO12as anode materialfor lithium-ion batteries" Journal of Alloys and Compounds (2009) vol. 487 pp. L12-L17.
Liddle B.J. et al., "A new one-pot hydrothermal synthesis and electrochemical characterizationof Li1+xMn2 yO4spinel structured compounds", Energy & Environmental Science (2010) vol. 3, pp. 1339-1346.
Lu J. et al., "High-Performance Anode Materials for Rechargeable Lithium-Ion Batteries", Electrochemical Energy Reviews (2018) vol. 1 pp. 35-53.
Lu X. et al., "Atomic-scale investigation on lithium storage mechanism in TiNb2O7", Energy & Environmental Science (2011) vol. 4 pp. 2638-2644.
Luo J., "Interfacial engineering of solid electrolytes", Journal of Materiomics (2015) vol. 1, Issue 1, pp. 22-32.
Maunel et al., "Review on composite polymer electrolytes for lithium batteries", Polymer (2006) vol. 47 pp. 5952-5964.
Mosa J. et al., "Li4Ti5O12thin-film electrodes by solegel for lithium-ionmicrobatteries", Journal of power sources (2013) vol. 244 pp. 482-487.
Nakagawa A. et al., "Characterization of Stable Solid Electrolyte Lithium Silicate for Thin Film Lithium Battery", Proc. 3rd Int. Conf. Physics of Solid State Ionics (ICPSSI-3), J. Phys. Soc. Jpn. (2010) vol. 79, Suppl. A, pp. 98-101.
Neudecker et al., "Lithium silicon tin oxynitride (LiySiTON) : high-performance anode in thin-film lithium-ion batteries for microelectronics", Journal of Powder Sources, vol. 81 (1999) p. 27-32 (XP55558948A).
Ni H. et al., "Enhanced rate performance of lithium titanium oxide anodematerial by bromine doping", Ionics (2015) vol. 21 pp. 3169-3176.
Niedzicki L. et al., "Lithium cation conducting TDI anion-basedionic liquids", Phys.Chem.Chem.Phys. (2014) vol. 16 pp. 11417-11425.
Nitta N. et al., "Li-ion battery materials: present and future", Elsevier Enhanced Reader, Materials Today, (2015) vol. 18, No. 5 pp. 252-264.
Ohta N. et al., "Enhancement of the High-Rate Capability of Solid-State LithiumBatteries by Nanoscale Interfacial Modification", Adv. Mater. (2006) vol. 18, pp. 2226-2229.
Ohta N. et al., "LiNbO3-coated LiCoO2as cathode material for all solid-statelithium secondary batteries", Electrochemistry Communications (2007) vol. 9 pp. 1486-1490.
Okada K. et al., "Preparation and electrochemical properties of LiAlO2-coatedLi(Ni1/3Mn1/3Co1/3)O2for all-solid-state batteries", Solid State Ionics (2014) vol. 255 pp. 120-127.
O'Reilly M.V. et al., "Silica nanoparticles densely grafted with PEO for ionomer plasticization", RSC Advances (2015) vol. 5, pp. 19570-19580.
Park H. et al., "Porosity-Controlled TiNb 2 O 7 Microspheres with Partial Nitridation as A Practical Negative Electrode for High-Power Lithium-Ion Batteries", Advanced Energy Materials (2015), 1401945, pp. 1-7.
Qi Y. et al., "Preparation and characterization of novel spinel Li4Ti5O12-xBrxanode materials", Electrochimica Acta (2009) vol. 54 pp. 4772-4776.
Rho Y.H. et al., "LiCoO2and LiMn2O4Thin-Film Electrodesfor Rechargeable Lithium Batteries, Preparation Using PVP Sol-Gel to Produce ExcellentElectrochemical Properties", Journal of The Electrochemical Society (2003) vol. 150 n°1 pp. A107-A111.
Rho Y.H. et al., "Preparation of Li4/3Ti5/3O4Thin Film Anode with High Electrochemical Response forRechargeable Lithium Batteries by Sol-Gel Method", Chemistry Letters (2001) pp. 1322-1323.
Rho Y.H. et al., "Preparation of Li4'3Ti5'3O4Thin Film Electrodesby a PVP Sol-Gel Coating Method and TheirElectrochemical Properties", Journal of The Electrochemical Society (2004) vol. 151, n°1 pp. A106-A110.

\* cited by examiner

POROUS ELECTRODES FOR ELECTROCHEMICAL DEVICES

This application is a national stage application of PCT-application number PCT/FR2019/051028 filed on May 6, 2019, which claims priority of French patent application No. 1853920 filed on May 7, 2018, both of which disclosures are incorporated herein by reference.

TECHNICAL FIELD OF THE INVENTION

The invention relates to the field of electrochemistry, in particular electrochemical systems and more particularly thin-layer electrochemical systems. It relates more precisely to electrodes that can be used in electrochemical systems such as high-power batteries (in particular lithium-ion batteries), supercapacitors, fuel cells, and photovoltaic cells. It applies to anodes and cathodes. The invention relates to porous electrodes; they can be impregnated with a liquid electrolyte.

The invention also relates to a method for preparing such a porous electrode, preferably as a thin layer, which implements nanoparticles of an electrode material, and to the electrodes thus obtained. The invention also relates to a method for manufacturing an electrochemical device comprising at least one of these electrodes, and to the devices thus obtained.

STATE OF THE ART

There are many technologies for storing electrical energy; for a given application the choice depends above all on the power requirement (expressed in W) and on the energy requirement (expressed in Wh). For example, if high power is sought over a relatively short period of time, capacitors or supercapacitors can be a good solution. They are comprised of two porous electrodes (most often made of active carbon in order to ensure good electronic conductivity) separated by an insulating membrane; the electrodes are immersed in an electrolyte that will form on the surface of the electrodes a double electric layer able to store the electrical energy. These devices are characterized by a very fast charge and discharge time.

Storing electrical energy used in electric vehicles, mobile telephones or in computers must satisfy different needs, namely a high power provided over a rather long period of time. Lithium-ion batteries are then often used. They are comprised of a positive electrode, an electrolyte and a negative electrode. During the operation thereof, ions of lithium are transported from one to the other of the electrodes through the electrolyte. During the charging of the battery, a quantity of lithium reacts with the active material of the positive electrode from the electrolyte, and an equivalent quantity of lithium ions is introduced into the electrolyte from an active material of the negative electrode, the concentration in lithium ions thus remaining constant in the electrolyte. The insertion of lithium in the material forming the electrode is offset by the supply of electrons from the negative electrode via an external circuit; thus the battery can supply an electric current. During charging, the reverse phenomena take place.

The power density of lithium-ion batteries is globally less than that of supercapacitors due to the rather slow diffusion of the lithium ions in the thickness of the active materials (electrodes, electrolyte) and the time to transport the lithium ions in the electrolyte. The storage capacity of a lithium-ion battery depends among other things on its electrodes, in particular the quantity of active material present within the electrodes and to a lesser degree on their thickness: with density and surface the same, the thicker the electrodes are, the higher the energy storage capacity of the battery will be. However, the internal resistance (series resistance) of the battery increases with the thickness of the layers.

To exceed the performance of conventional lithium-ion batteries, materials are sought that have a high storage capacity and high charge-discharge power. More precisely, it is desired to have batteries that have a high energy density, a high power density, and long longevity (expressed as a calendar duration and in the number of charging and discharging cycles); for certain uses batteries are sought that operate well at low temperature (knowing that the series resistance internal to the battery increases when the temperature drops). Moreover, the battery, in light of the substantial energy that it is likely to store, must not present a safety risk in case of malfunction; for example it must not ignite. Finally, the various constituents of a lithium battery must be chosen in such a way as to be able to produce, with robust and inexpensive methods, batteries with a low cost price.

Electrochemical cells are known such as lithium-ion batteries that use particles of active electrode materials of micrometric size linked by an organic binder. WO 02/075 826 discloses electrodes for electrochemical cells comprised of a mesostructured electrode material and an organic binder. As the organic binder is an electronic insulator, it is charged with carbon particles, an electronic conductor. These electrodes comprise a three-dimensional mesoporous structure that can be impregnated with an electrolyte in such a way as to form a junction with a large specific surface area. The three-dimensional structure of the electrode makes it possible to overcome the problem of ion diffusion in the electrolyte, inherent to the conventional electrodes with a large active surface area, and ensure interconnectivity as well as access of the liquid organic electrolyte to the entire porous space. The mechanical stability of the structure is substantially provided by the organic binder within the mesoporous electrode.

The presence of organic binder is an essential characteristic of the electrodes described in WO 02/075 826, but it has several disadvantages. The organic binder charged with electrically conductive particles can give rise to failures during the thermal cycle: the particles of electrode material connected together by the organic binder can locally lose the electric contact, which results in an progressive increase in the series resistance of the battery. The presence of an organic binder also limits the working temperature of the battery, and still has a risk of fire.

And finally, the presence of an organic binder can be incompatible with certain manufacturing methods, and in particular with those that involve a vacuum deposition and/or a deposition at a high temperature. In particular, the presence of an organic binder does not allow for the later use of depositions of a dielectric layer by Atomic Layer Deposition (ALD) since the binder risks breaking down and polluting the ALD reactor during the deposition. Moreover, the presence of binder can prevent the coating made by ALD from being conformal and playing its role, i.e. to block the parasite reactions that can arise between the electrodes and the electrolyte. However, carrying out these depositions by ALD favors the longevity of these electrodes, and a fortiori the resistance over time of the batteries that contain them. The presence of organic binder within a battery prevents the encapsulation thereof on an optimum manner.

Moreover, these electrochemical cells such as lithium-ion batteries typically use electrolytes that comprise more than 50% by weight of solvent, which represents a safety risk in case of malfunction; these batteries can ignite.

The present invention seeks to overcome at least a portion of the disadvantages of the prior art mentioned hereinabove.

More precisely, the problem that the present invention seeks to resolve is to provide a method for manufacturing porous electrodes having a controlled pore density that is simple, safe, fast, easy to implement, inexpensive and able to overcome the use of organic binders and/or electronic conductive materials such as graphite.

The present invention also aims to propose safe porous electrodes that have a high ionic conductivity, a stable mechanical structure, good thermal stability and a substantial service life.

Another purpose of the invention is to propose electrodes for batteries that can operate at a high temperature without a problem of reliability and without the risk of fire.

Another purpose of the invention is to propose porous electrodes that have, in addition to the preceding characteristics, low interfacial resistance.

Another purpose of the invention is to propose porous electrodes that, in addition to the preceding characteristics, can easily be wetted and impregnated by an ionic liquid.

Another purpose of the invention is to propose porous electrodes impregnated with an electrolyte of which the parasite reactions are minimized.

Another purpose of the invention is to provide a method for manufacturing an electronic, electric or electrotechnical device such as a battery, a capacitor, a supercapacitor, a photovoltaic cell comprising a porous electrode according to the invention.

Yet another purpose of the invention is to propose devices such as batteries, lithium-ion battery cells, capacitors, supercapacitors, photovoltaic cells able to store high energy densities, restore this energy with very high power densities (in particular in the capacitors and supercapacitors), resist high temperatures, have a high service life duration and be able to be encapsulated by coating deposited by ALD under a high temperature.

OBJECTS OF THE INVENTION

According to the invention the problem is resolved through the use of at least one electrode that has a porous structure that has a porosity greater than 30% by volume. Very preferably, this porosity is a mesoporosity. This electrode can be deposited by electrophoresis from a colloidal suspension of nanoparticles of electrode material. Preferably it does not contain any binder. According to an essential characteristic of the invention this suspension includes aggregates or agglomerates of nanoparticles.

A first object of the invention is a method for producing a porous electrode, preferably with a thin layer, said electrode comprising a layer deposited on a substrate, said layer being binder-free and having a porosity of more than 30% by volume, and pores having an average diameter of less than 50 nm, said method being characterized in that:
  (a) a colloidal suspension is provided, containing aggregates or agglomerates of nanoparticles of at least one material P having an average primary diameter $D_{50}$ of less than or equal to 80 nm, and preferably less than or equal to 50 nm, said aggregates or agglomerates having an average diameter comprised between 80 nm and 300 nm (preferably between 100 nm and 200 nm),
  (b) a substrate is provided,
  (c) a porous electrode layer is deposited on said substrate, preferably mesoporous, by electrophoresis, by ink-jet printing hereinafter "ink-jet", by scraping hereinafter "doctor blade", by roll coating, by curtain coating or by dip-coating, from said colloidal suspension provided in step (a),
  (d) said layer obtained in step c) is dried, preferably in an air flow.

The order of steps (a) and (b) is not important.

After step (d) a step e) can be added wherein the porous, preferably mesoporous, electrode layer is consolidated, obtained in step d) by pressing and/or heat treatment (i.e. heating). A heat treatment step can be added after step (d), possibly preceded by a pressure step, in order to improve the performance of the electrodes obtained. According to the materials used, this heat treatment (i.e. heating) can improve the texturing of the layer, improve the crystalline state of the layer, improve the sintering of the nanoparticles, or improve the adhesion of the layer to the substrate. The heat treatment carried out on a porous electrode layer obtained from a colloidal suspension of aggregated nanoparticles, favors the agglomeration of the nanoparticles, i.e. the creation of strong bonds between these nanoparticles. The heat treatment can also be carried out at the same time as the pressure is applied.

Advantageously, the electrophoretic deposition is carried out in step c) by stationary galvanostatic electrodeposition or by pulsed-mode galvanostatic electrodeposition. Advantageously the total porosity of the porous electrodes does not exceed 50% by volume. Advantageously, the average diameter of the pores is comprised between 2 nm and 80 nm, preferable comprised between 2 nm and 50 nm, preferably comprised between 6 nm and 30 nm and even more preferably between 8 nm and 20 nm.

In an embodiment of this method:
  (a1) a colloidal suspension is provided including nanoparticles, preferably monodispersed, of at least one material P with a primary diameter $D_{50}$ less than or equal to 80 nm, and preferably less than or equal to 50 nm;
  (a2) the nanoparticles, preferably monodispersed, present in said colloidal suspension are destabilized so as to form aggregates or agglomerates of particles with an average diameter comprised between 80 nm and 300 nm, preferably between 100 nm and 200 nm, said destabilization being done preferably by adding a destabilizing agent such as a salt, preferably LiOH;
  (b) a substrate is provided;
  (c) a porous electrode layer is deposited on said substrate by electrophoresis, by ink-jet, by doctor blade, by roll coating, by curtain coating or by dip-coating, from said colloidal suspension comprising the aggregates or agglomerates of nanoparticles obtained in step (a2);
  (d) said layer is dried, preferably in an air flow, and a step (e) can be added after the step (d) of consolidation of the porous electrode layer obtained in step (d) such as a step of pressing and/or heat treatment (i.e. heating), preferably a step of heat treatment, possibly preceded by a step of pressure, so as to improve the performance of the electrodes obtained. The heat treatment can also be carried out at the same time as the pressure is applied.

The order of steps (a1) and (b) is not important.

Advantageously, the deposition, preferably electrophoretic deposition obtained in step (c) has a thickness less than 10 μm, preferably less than 8 μm, and even more preferably comprised between 1 μm and 6 μm.

Said primary nanoparticles forming aggregates or agglomerates are preferably monodispersed, i.e. their primary diameter has a narrow distribution. This allows for better control of the porosity. Advantageously, the diameter of said nanoparticles is comprised between 10 nm and 50 nm, preferably between 10 nm and 30 nm.

The heat treatment results in the partial coalescence of the nanoparticles of material P (phenomenon called necking) that favors the conduction of the electrons between the nanoparticles, knowing that nanoparticles have a high surface energy that is the driving force for this structural modification; the latter occurs at a temperature much lower than the melting point of the material, and after a rather short treatment time. Thus a three-dimensional porous structure is created within which the lithium ions have a mobility that is not slowed by the grain boundaries or layers of binder. This partial coalescence of the aggregated nanoparticles allows for the transformation of the aggregates into agglomerates. The partial coalescence of the agglomerated nanoparticles induced by the heat treatment allows for the consolidation of the three-dimensional mesoporous structure.

Moreover, the ionic conduction can also be provided by the electrolyte impregnated in the electrode according to the invention. This structure also has good mechanical resistance of the layer.

The aggregates, respectively agglomerates, can also be obtained directly after hydrothermal synthesis if the suspension is not sufficiently purified: the ionic strength of the suspension then leads to the aggregation, respectively agglomeration of the primary nanoparticles to form aggregated, respectively agglomerated, particles of a larger size.

In a particular embodiment is deposited after step (d) or after step (e), preferably by atomic layer deposition ALD, during a step (f) a layer of electrically-insulating material on and inside the pores of the porous, preferably mesoporous, layer. This electrically-insulating material can be chosen from $Al_2O_3$, $SiO_2$, $ZrO_2$. This covering coating typically has a thickness comprised between 1 nm and 5 nm. It makes it possible to reduce the interfacial faradic reactions that exist between the porous electrode layer and the electrolyte. These layers can also be deposited by chemical solution, known under the acronym CSD (Chemical Solution Deposition).

Alternatively is deposited after step (d) or after step (e), preferably by ALD or by CSD, during a step (f) a layer of ionic conductive material chosen from $Li_3PO_4$, $Li_3BO_3$, lithium lanthanum zirconium oxide, preferably $Li_7La_3Zr_2O_{12}$, on and inside the pores of the porous, preferably mesoporous, layer. This covering coating typically has a thickness comprised between 1 nm and 5 nm.

Another object of the invention relates to a porous, preferably mesoporous, electrode that can be used in a lithium-ion battery. Another object of the invention relates to a porous, preferably mesoporous, electrode, with a porosity greater than 30% by volume comprising pores with an average diameter less than 80 nm, preferably less than 50 nm, a primary particle diameter less than 30 nm, comprising, preferably, a thickness less than 100 µm, preferably less than 50 µm and more preferably less than 10 µm, characterized in that it is binder-free.

Advantageously, said porous, preferably mesoporous, electrode pores, are impregnated by an electrolyte, preferably a phase carrying lithium ions such as an ionic liquid containing lithium salts, possibly diluted with an organic solvent or a mixture of organic solvents containing a lithium salt that can be different from the one dissolved in the ionic liquid or such as a solvent diluted in at least one ionic liquid, preferably representing more than 50% by weight of the entire phase carrying lithium ions.

Advantageously, said porous, preferably mesoporous, electrode pores, are impregnated with a phase carrying lithium ions comprising at least 50% by weight of at least one ionic liquid.

Another object of the invention relates to a method for manufacturing a battery, implementing the method of manufacturing a porous electrode according to the invention. Another object of the invention relates to a battery comprising at least one porous electrode able to be obtained by the method according to the invention. Another object of the invention relates to a battery of which all of the electrodes thereof are porous electrodes able to be obtained by the method according to the invention.

BRIEF DESCRIPTION OF THE FIGURES

FIG. 2 shows nanoparticles before (FIG. 2(a)) and after heat treatment (FIG. 2(b)), showing the necking phenomenon.

List of marks used in the figures:

TABLE 1

Figure 1A:
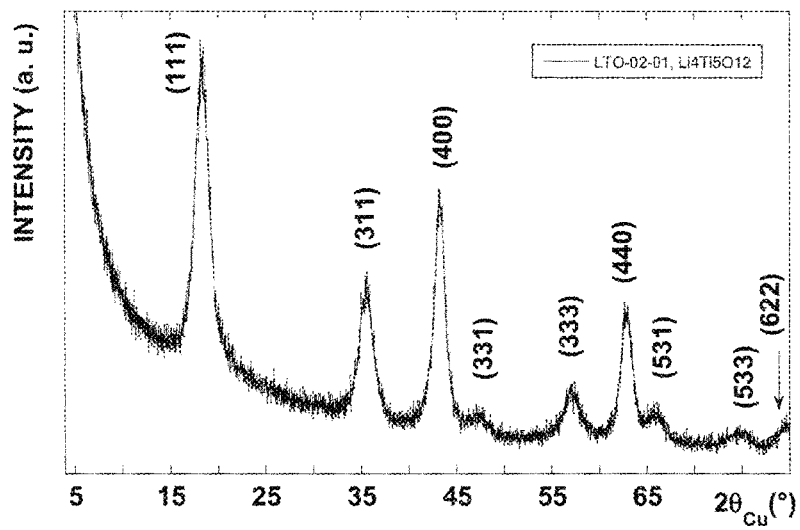
FIG. 1(a) shows a diffractogram, FIG. 1(b) a snapshot obtained by transmission electron microscopy of primary nanoparticles used for the deposition of electrodes according to the invention by electrophoresis.

| | | | |
|---|---|---|---|
| 1 | Battery | 22 | Layer of a porous cathode active material |
| 2 | Elementary cell | 23 | Layer of an electrolyte material/porous layer playing the role of a separator impregnated with a phase carrying lithium ions. |
| 11 | Layer of a substrate used as a current collector | 30 | Encapsulation system |
| 12 | Layer of a porous anode active material | 40 | Termination |
| 13 | Layer of an electrolyte material/ porous layer playing the role of a separator impregnated with a phase carrying lithium ions. | 50 | Anode and/or cathode connections |
| 21 | Layer of a substrate used as a current collector | 51 | Contact surface |
| 60 | Welding zone between the porous layer and the substrate | 62 | dielectric layer deposited on the accessible surface of the electrodes |
| 61 | pore | 63 | dielectric layer deposited on the accessible surface of the substrate |

DETAILED DESCRIPTION

1. Definitions

In the context of this document, the particle size is defined by its largest dimension. "Nanoparticle" refers to any particle or object of a nanometric size that has at least one of its dimensions less than or equal to 100 nm.

"Ionic liquid" means any liquid salt, able to transport electricity, being differentiated from all molten salts by a melting temperature less than 100° C. Some of these salts remain liquid at ambient temperature and do not solidify, even at very low temperature. Such salts are called "ionic liquids at ambient temperature".

"Mesoporous materials" refers to any solid that has within its structure pores referred to as "mesopores" that have a size that is intermediate between that of micropores (width less than 2 nm) and that of macropores (width greater than 50 nm), namely a size comprised between 2 nm and 50 nm. This terminology corresponds to that adopted by IUPAC (International Union for Pure and Applied Chemistry), which is a reference for those skilled in the art. Therefore the term "nanopore" is not used here, although mesopores such as defined hereinabove have nanometric dimensions in terms of the definition of nanoparticles, knowing that pores of a size less than that of mesopores are called "micropores" by those skilled in the art.

A presentation of the concepts of porosity (and of the terminology that has just been disclosed hereinabove) is given in the article "*Texture des matériaux pulvérulents ou poreux*" by F. Rouquerol et al. published in the collection "*Techniques de l'Ingénieur*", traité Analyse et Caractérisation, fascicule P 1050; this article also describes the techniques for characterizing porosity, in particular the BET method.

In terms of this invention, "mesoporous electrode" or "mesoporous layer" refers to an electrode, respectively a layer that has mesopores. As shall be explained hereinbelow, in these electrodes or layers the mesopores contribute significantly to the total porous volume; this state is referred to using the expression "mesoporous electrode or layer with a mesoporous porosity greater than X % by volume" used in the description hereinbelow.

"Aggregate" means, according to the definitions of UPAC a weakly linked assembly of primary particles. Here, these primary particles are nanoparticles that have a diameter that can be determined by transmission electron microscopy. An aggregate of aggregated primary nanoparticles can normally be destroyed (i.e. reduced to primary nanoparticles) in suspension in a liquid phase under the effect of ultrasound, according to a technique known to those skilled in the art.

"Agglomerate" means, according to the definitions of UPAC a strongly linked assembly of primary particles or aggregates.

According to the invention, the porous, preferably mesoporous, electrode layer can be deposited electrophoretically, by dip-coating, by ink-jet or by doctor blade, by roll coating, by curtain coating and this from a suspension of aggregates or agglomerates of nanoparticles, preferably from a concentrate suspension containing agglomerates of nanoparticles.

2. Preparation of Suspensions of Nanoparticles

In the framework of the present invention it is preferable to not prepare these suspensions of nanoparticles from dry nanopowders. They can be prepared by grinding of powders or nanopowders in liquid phase. In another embodiment of the invention the nanoparticles are prepared in suspension directly by precipitation. The synthesis of nanoparticles by precipitation makes it possible to obtain primary nanoparticles of a very homogenous size with a unimodal size distribution i.e. very tight and monodispersed, with good crystallinity and purity. Using these nanoparticles of a very homogenous size and narrow distribution makes it possible to obtain after deposition a porous structure with a controlled and open porosity. The porous structure obtained after deposition of these nanoparticles has little, preferably no closed pores.

In a more preferred embodiment of the invention the nanoparticles are prepared directly at their primary size by hydrothermal or solvothermal synthesis; this technique makes it possible to obtain nanoparticles with a very narrow size distribution, called "monodispersed nanoparticles". The size of these non-aggregated or non-agglomerated nanopowders/nanoparticles is called the primary size. It is advantageously comprised between 10 nm and 50 nm, preferably between 10 nm and 30 nm; this favors during later steps of the method the formation of an interconnected mesoporous network with electronic and ionic conduction, thanks to the phenomenon of necking.

This suspension of monodispersed nanoparticles can be made in the presence of ligands or of organic stabilizers in such a way as to prevent the aggregation, even the agglomeration of the nanoparticles.

This suspension of monodispersed nanoparticles can be purified in order to remove all the potentially interfering ions. According to the degree of purification it can then be specially treated to form aggregates or agglomerates of a controlled dimension. More precisely, the formation of aggregates or of agglomerates can result from the destabilization of the suspension caused in particular by ions, by the increase in the dry extract of the suspension, by changing the solvent of the suspension, by adding destabilization agent. If the suspension was entirely purified it is stable, and ions are added in order to destabilize it, typically in the form of a salt; these ions are preferably lithium ions (preferably added in the form of LiOH).

If the suspension was not entirely purified the formation of the aggregates or of the agglomerates can proceed alone spontaneously or via aging. This way of proceeding is simpler because it involves fewer purification steps, but it is more difficult to control the size of the aggregates or of the agglomerates. One of the essential aspects for the manufacture of electrodes according to the invention consists of controlling the size of the primary particles of electrode materials and their degree of aggregation or agglomeration. If the stabilization of the suspension of nanoparticles intervenes after the formation of agglomerates, the latter will remain in the form of agglomerates; the suspension obtained can be used to make mesoporous depositions.

It is this suspension of aggregates or agglomerates that is then used for electrophoretic deposition, by ink-jet, by doctor blade, roll coating, by curtain coating or by dip-coating the porous, preferably mesoporous, electrode layers, according to the invention.

According to the observations of the applicant, with an average diameter of aggregates or agglomerates of nanoparticles comprised between 80 nm and 300 nm (preferably between 100 nm to 200 nm) during later method steps, a mesoporous layer is obtained that has an average diameter of mesopores comprised between 2 nm and 50 nm.

According to the invention, the porous electrode layer can be deposited electrophoretically, by dip-coating, by ink-jet, by roll coating, by curtain coating or by doctor blade, by roll coating, by curtain coating and this from a solution comprising aggregates or agglomerates of nanoparticles, preferably from a concentrated solution suspension containing agglomerates of nanoparticles. The porous electrode layer is advantageously deposited by the dip-coating method from a concentrated solution containing agglomerates of nanoparticles.

The methods of deposition of aggregates or agglomerates of nanoparticles electrophoretically, by dip-coating, by ink-jet, by roll coating, by curtain coating, or by doctor blade are methods that are simple, safe, easy to implement, easy to industrialize and that make it possible to obtain a homogenous final porous layer. Electrophoretic deposition is a technique that makes it possible to uniformly deposit over large surfaces with high deposition speeds. Coating techniques, in particular by dipping, roll, curtain or doctor blade, make it possible to simplify the management of the baths with respect to the techniques of electrophoretic deposition. Ink-jet deposition makes it possible to make localized depositions.

Porous electrodes in a thick layer and made in a single step can be obtained by roll coating, curtain coating or by doctor blade.

3. Nature of the Current Collector

The substrate used as a current collector within batteries that use porous electrodes according to the invention can be metallic, for example a metal foil, or a polymeric or non-metallic foil that is metalized (i.e. coated with a layer of metal). The substrate is preferably chosen from foils made from titanium, copper, nickel or stainless steel.

The metal foil can be coated with a layer of noble metal, in particular chosen from gold, platinum, titanium or alloys containing mostly at least one or more of these metals, or with a layer of conductive material of the ITO type (which has the advantage of also acting as a diffusion barrier).

In batteries that use porous electrodes according to the invention, the liquid electrolytes that impregnate the porous electrode are in direct contact with the current collector. However, when these electrolytes are in contact with the metal and polarized substrates with very anodic potentials for the cathode and very cathodic for the anode, these electrolytes are able to induce a dissolution of the current collector. These parasite reactions can degrade the service life of the battery and accelerate the self-discharging thereof. In order to prevent this, aluminum current collectors are used at the cathode, in all lithium-ion batteries. Aluminum has this particularity of anodizing at very anodic potentials, and the layer of oxide thus formed on the surface thereof protects it from dissolution. However, aluminum has a melting temperature close to 600° C. and cannot be used for the manufacture of batteries according to the invention. The consolidation treatments of all-solid-state electrodes would lead to melting the current collector. Thus, to prevent the parasite reactions that can degrade the service life of the battery and accelerate the self-discharging thereof, a foil made of titanium is advantageously used as a current collector at the cathode. During the operation of the battery, the foil made of titanium will, like aluminum, anodize and its layer of oxide will prevent any parasite reactions of dissolution of the titanium in contact with the liquid electrolyte. In addition, as titanium has a melting point that is much higher than aluminum, all-solid-state electrodes according to the invention, can be made directly on this type of foil.

Using these massive materials, in particular foils made of titanium, copper or nickel, also makes it possible to protect the cut edges of the electrodes of batteries from corrosion phenomena.

Stainless steel can also be used as a current collector, in particular when it contains titanium or aluminum as alloy element, or when it has on the surface a thin layer of protective oxide.

Other substrates used as a current collector can be used such as less noble metal foils covered with a protective coating, making it possible to prevent any dissolution of these foils induced by the presence of electrolytes in contact with them.

These less noble metal foils can be foils made of Copper, Nickel or foils of metal alloys such as foils made of stainless steel, foils of Fe—Ni alloy, Be—Ni—Cr alloy, Ni—Cr alloy or Ni—Ti alloy.

The coating that can be used to protect the substrates used as current collectors can be of different natures. It can be a:
- thin layer obtained by sol-gel process of the same material as that of the electrode. The absence of porosity in this film makes it possible to prevent contact between the electrolyte and the metal current collector.
- thin layer obtained by vacuum deposition, in particular by physical vapor deposition (PVD) or by chemical vapor deposition (CVD), of the same material as that of the electrode,
- thin metal layer, dense, without defects, such as a thin metal layer of gold, titanium, platinum, palladium, tungsten or molybdenum. These metals can be used to protect the current collectors because they have good conduction properties and can resist heat treatments during the subsequent method of manufacturing electrodes. This layer can in particular be made by electrochemistry, PVD, CVD, evaporation, ALD.
- thin layer of carbon such as diamond carbon, graphic, deposited by ALD, PVD, CVD or by inking of a sol-gel solution making it possible to obtain after heat treatment a carbon-doped inorganic phase to make it conductive.
- layer of conducting oxides, such as a layer of ITO (indium tin oxide) only deposited on the cathode substrate because the oxides are reduced to low potentials.
- layer of conducting nitrides, such as a layer of TiN only deposited on the cathode substrate because the nitrides insert the lithium at low potentials.

The coating that can be used to protect the substrates used as current collectors must be electronically conductive in order to not harm the operation of the electrode deposited later on this coating, by making it too resistive.

Generally, in order to not excessively impact the operation of the battery cells, the maximum dissolution currents measured on the substrates, at the operating potentials of the electrodes, expressed in $\mu A/cm^2$, must be 1000 times less that the surface capacities of the electrodes expressed in $\mu Ah/cm^2$.

4. Electrophoretic Deposition of Layers

The method according to the invention advantageously used the electrophoresis of suspensions of nanoparticles as a deposition technique of porous, preferably mesoporous, electrode layers. The method of deposition of electrode layers from a suspension of nanoparticles is known as such (see for example EP 2 774 194 B1). This substrate can be metallic, for example a metal foil, or a polymeric foil or metalized non-metallic (i.e. coated with a layer of metal). The substrate used as a current collector within batteries that use porous electrodes according to the invention is preferably chosen from foils of titanium, copper, stainless steel or nickel.

It is possible for example to use a stainless steel foil with a thickness of 5 μm. The metal foil can be coated with a layer of noble metal, in particular chosen from gold, platinum, titanium or alloys containing mostly at least one or more of these metals, or with a layer of conductive material of the ITO type (which has the advantage of also acting as a diffusion barrier).

In a particular embodiment on the metal layer is deposited a layer, preferably a thin layer, of an electrode material; this deposition must be very thin (typically a few tens of nanometers, and more generally comprised between 10 nm and 100 nm). It can be done via a sol-gel method. It is possible for example to use $LiMnO_4$ for a porous cathode of $LiMn_2O_4$.

So that the electrophoresis can take place, a counter-electrode is placed in the suspension and a voltage is applied between the conductor substrate and said counter-electrode.

In an advantageous embodiment, the electrophoretic deposition of aggregates or agglomerates of nanoparticles is carried out by pulsed-mode galvanostatic electrodeposition; high-frequency current pulses are applied, this prevents the formation of bubbles at the surface of the electrodes and the variations in the electric field in the suspension during the deposition. The thickness of the electrode layer deposited as such by electrophoresis, preferably by pulsed-mode galvanostatic electrodeposition is advantageously less than 10 μm, preferably less than 8 μm, and is even more preferably between 1 μm and 6 μm.

5. Deposition of a Porous Electrode Layer by Dip-Coating

It is possible to deposit aggregates or agglomerates of nanoparticles by the dip-coating method and this, regardless of the chemical nature of the nanoparticles used. This deposition method is preferred when the nanoparticles used are little or not at all electrically charged. In order to obtain a layer of desired thickness, the step of deposition by dip-coating aggregates or agglomerates of nanoparticles followed by the step of drying of the layer obtained are repeated as much as necessary.

Although this succession of coating steps by dipping/drying are time consuming, the method of deposition by dip-coating is a simple, safe, easy to implement, easy to industrialize method making it possible to obtain a homogenous and compact final layer.

6. Treatment and Properties of the Deposited Layers

The deposited layers must be dried; drying must not induce the formation of cracks. For this reason it is preferred to carry it out in controlled humidity and temperature conditions.

Figure 2A:
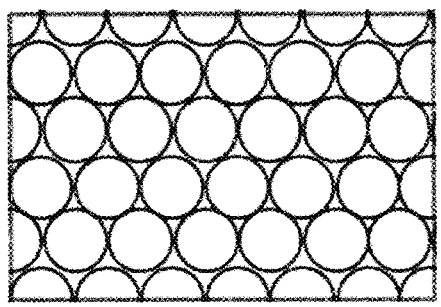
Figure 2B:
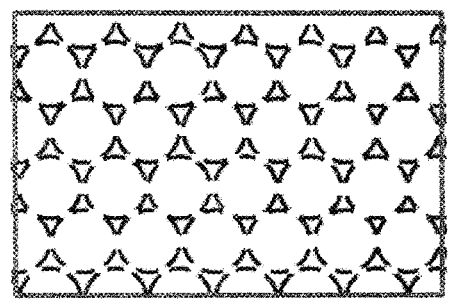
Figure 3:
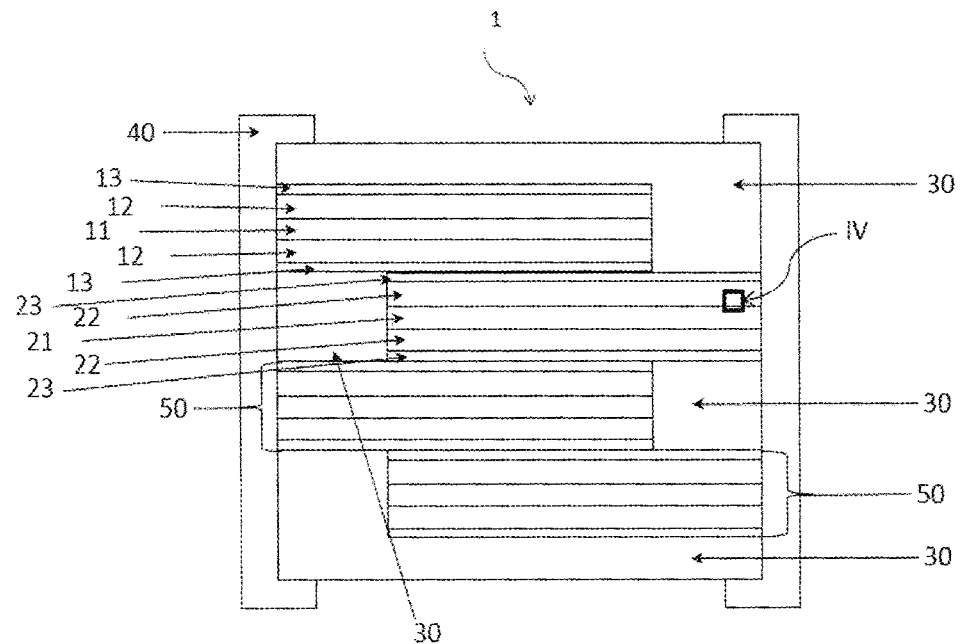
FIG. 3 diagrammatically shows a front view with the pulling-out of a battery comprising an electrode according to the invention and showing the structure of the battery comprising an assembly of elementary cells covered by a system of encapsulation and terminations.

The dried layers can be consolidated by a step of pressing and/or heating (heat treatment). In a very advantageous embodiment of the invention this treatment leads to a partial coalescence of the primary nanoparticles in the aggregates, or the agglomerates, and between neighboring aggregates or agglomerates; this phenomenon is called "necking" or "neck formation". It is characterized by the partial coalescence of two particles in contact, which remain separated by connected by a neck (shrinkage); this is shown diagrammatically in FIG. 2. The lithium ions and the electrons are mobile within these necks and can diffuse from one particle to the other without encountering grain boundaries. The nanoparticles are welded together in order to ensure the conduction of electrons from one particle to the other. Thus a three-dimensional network of interconnected particles with strong ion mobility and electronic conduction; this network includes pores, preferably mesopores.

The temperature required to obtain "necking" depends on the material; in light of the diffusive nature of the phenomenon that leads to necking the duration of the treatment depends on the temperature.

The heat treatment can also be used to remove the organic additives that may be present in the suspension of nanoparticles used such as ligands or residual organic stabilizers. When the suspension of nanoparticles used comprises only nanoparticles and a solvent, i.e. when it is free of ligands or residual organic stabilizers, the heat treatment that allows for consolidation is not necessary.

Advantageously, the dried electrode layer, and preferably consolidated, does not contain binder but can contain up to 10% by weight of carbon, in particular in the form of graphene, carbon black or carbon nanotubes.

The inventors have observed that due to the very large specific surface area of the porous, preferably mesoporous electrodes according to the invention, during the use thereof with a liquid electrolyte parasite reactions can occur between the electrodes and the electrolyte; these reactions are at least partially irreversible. In an advantageous embodiment a very thin dielectric layer is applied (i.e. an electronic insulator), that covers and is preferably without defects, on the porous, preferably mesoporous, electrode layer, so as to passivate the surface of the electrode, limit the kinetics of the parasite electrochemical reactions and even block these parasite reactions. This dielectric layer advantageously has an electronic conductivity less than $10^{-8}$ S/cm. Advantageously, this dielectric layer can be a layer of an electrically-insulating material deposited on and inside the pores of the porous electrode layers, preferably by the technique of atomic layer deposition ALD or chemically in solution CSD, during a step f) after step d) of drying the porous electrode layer or after the step e) of consolidation of the porous electrode layer. Advantageously this deposition is carried out at least on one face of the electrode that forms the interface between the electrode and the electrolyte. This layer can for example by made of alumina $Al_2O_3$, silica $SiO_2$, or zirconia $ZrO_2$. $Li_4Ti_5O_{12}$ can be used on the cathode or another material that, like $Li_4Ti_5O_{12}$, has the characteristic of not inserting, at the operating voltages of the cathode, lithium and of behaving as an electronic insulator.

Alternatively this dielectric layer can be an ionic conductor, which advantageously has an electronic conductivity less than $10^{-8}$ S/cm. This material has to be chosen in such a way as to not insert, at the operating voltages of the battery, lithium but only to transport it. Advantageously, this dielectric layer can be a layer of an ionic conductor material deposited on and inside the pores of the porous electrode layers, preferably by the technique of atomic layer deposition ALD or chemically in solution CSD, during a step f) after step d) of drying the porous electrode layer or after the step e) of consolidation of the porous electrode layer. For this can be used for example $Li_3PO_4$, $Li_3BO_3$, lithium lanthanum zirconium oxide (called LLZO), such as $Li_7La_3Zr_2O_{12}$, that have a wide range of operating potential. On the other hand, lithium lanthanum titanium oxide (abbreviated LLTO), such as $Li_{3x}La_{2/3-x}TiO_3$, lithium aluminum titanium phosphate (abbreviated LATP), lithium aluminum germanium phosphate (abbreviated LAGP), can be used only in contact with cathodes because their range of operating potential is limited; beyond this range they are able to insert the lithium into their crystallographic structure.

This deposition further improves the performance of lithium-ion batteries including at least one porous electrode according to the invention. The improvement observed consists substantially in a reduction of the interface faradic reactions with the electrolytes. These parasite reactions are all the more so important when the temperature is high; they are at the origin of reversible and/or irreversible losses in capacity.

Very advantageously this deposition is carried out by a technique allowing for a covering coating (also called conformal deposition), i.e. a deposition that faithfully reproduces the atomic topography of the substrate on which it is applied. The ALD (Atomic Layer Deposition) or CSD (Chemical Solution Deposition) technique, known as such, can be suitable. It can be implemented on the electrodes after manufacture, before and/or after the deposition of separator particles and before and/or after the assembly of the cell. The deposition technique by ALD is done layer by layer, by a cyclic method, and makes it possible to carry out an encapsulating coating that truly reproduces the topography of the substrate; it lines the entire surface of the electrodes. This covering coating typically has a thickness comprised between 1 nm and 5 nm. The deposition technique by CSD makes it possible to carry out an encapsulating coating that truly reproduces the topography of the substrate; it lines the entire surface of the electrodes. This covering coating typically has a thickness less than 5 nm, preferably comprised between 1 nm and 5 nm.

In this alternative deposition of a dielectric nanolayer, it is preferable that the primary diameter $D_{50}$ of the particles of electrode material be at least 10 nm in order to prevent the dielectric layer from clogging the open porosity of the electrode layer.

The dielectric layer must be deposited only on porous electrodes that do not contain any organic binder. Indeed, deposition by ALD is carried out at a temperature typically comprised between 100° C. and 300° C. At this temperature the organic materials that form the binder (for example the polymers contained in the electrodes made by tape casting of ink) risk decomposing and will pollute the ALD reactor. Moreover, the presence of residual polymers in contact with particles of active electrode material can prevent the ALD coating from covering the entire surface of the particles, which is detrimental to its effectiveness.

For example, a layer of alumina of a thickness of about 1.6 nm can be suitable.

Generally, the method according to the invention, which must make use of a step of deposition by electrophoresis of nanoparticles of electrode material (active material), makes for the nanoparticles to "weld" naturally together to generate a porous, rigid, three-dimensional structure, without organic binder; this porous, preferably mesoporous, layer, is perfectly suited for the application of a surface treatment by ALD that enters into the depth of the open porous structure of the layer.

On the porous, preferably mesoporous, electrodes, coated or not with a dielectric layer by ALD or by CSD, it is possible to further deposit a porous, preferably mesoporous, layer of nanoparticles of a dielectric material that will be used as a porous separator. This material can be in particular silica, alumina, zirconia. This porous layer, applied between the electrodes will be impregnated by capillarity by a phase carrying lithium ions such as liquid electrolytes so as to carry out a battery cell.

A layer of a solid electrolyte can also be deposited which is a lithium ion conductor and an electron insulator, for example $Li_3PO_4$ as a porous separator. In an embodiment a colloidal, monodispersed suspension of nanoparticles of silica is used (available off the shelf, for example from the company Alfa Aesar), with a particle size of 20 nm, which is diluted to 20 g/l. This suspension is then destabilized by adding LiOH to modify its ionic charge until aggregates or agglomerates are obtained of a size in the neighborhood of 100 nm. From this colloidal suspension of aggregates or agglomerates of nanoparticles, two layers of a thickness of 1.5 µm each are electrophoretically created, respectively on the anode and the cathode. These layers are then dried.

1. Particular Aspects for the Preparation of Cathodes

If the electrode according to the invention is a cathode it can be made from a cathode material P chosen from:

oxides $LiMn_2O_4$, $Li_{1+x}Mn_{2-x}O_4$ with $0<x<0.15$, $LiCoO_2$, $LiNiO_2$, $LiMn_{1.5}Ni_{0.5}O_4$, $LiMn_{1.5}Ni_{0.5-x}X_xO_4$ where X is selected from Al, Fe, Cr, Co, Rh, Nd, other rare earths such as Sc, Y, Lu, La, Ce, Pr, Pm, Sm, Eu, Gd, Tb, Dy, Ho, Er, Tm, Yb, and where $0<x<0.1$, $LiMn_{2-x}M_xO_4$ with M=Er, Dy, Gd, Tb, Yb, Al, Y, Ni, Co, Ti, Sn, As, Mg or a mixture of these compounds and where $0<x<0.4$, $LiFeO_2$, $LiMn_{1/3}Ni_{1/3}Co_{1/3}O_2$, $LiNi_{0.8}Co_{0.15}Al_{0.05}O_2$, $LiAl_xMn_{2-x}O_4$ with $0\le x<0.15$, $LiNi_{1/x}Co_{1/y}Mn_{1/z}O_2$ with $x+y+z=10$;

phosphates $LiFePO_4$, $LiMnPO_4$, $LiCoPO_4$, $LiNiPO_4$, $Li_3V_2(PO_4)_3$; phosphates of formula $LiMM'PO_4$, with M and M' (M≠M') selected from Fe, Mn, Ni, Co, V;

all lithium forms of the following chalcogenides: $V_2O_5$, $V_3O_8$, $TiS_2$, titanium oxysulfides ($TiO_yS_z$ with $z=2-y$ and $0.3\le y\le 1$), tungsten oxysulfides ($WO_yS_z$ with $0.6<y<3$ and $0.1<z<2$), CuS, $CuS_2$, preferably $Li_xV_2O_5$ with $0<x\le 2$, $Li_xV_3O_8$ with $0<x\le 1.7$, $Li_xTiS_2$ with $0<x\le 1$, titanium oxysulfides and lithium oxysulfides $Li_xTiO_yS_z$ with $z=2-y$, $0.3\le y\le 1$, $Li_xWO_yS_z$, $Li_xCuS$, $Li_xCuS_2$.

2. Particular Aspects for the Preparation of Anodes

If the electrode according to the invention is an anode it can be done from an anode material P chosen from:

carbon nanotubes, graphene, graphite;

lithium iron phosphate (of typical formula $LiFePO_4$);

silicon and tin oxinitrides (of typical formula $Si_aSn_bO_yN_z$ with $a>0$, $b>0$, $a+b\le 2$, $0<y\le 4$, $0<z\le 3$) (also called SiTON), and in particular $SiSn_{0.87}O_{1.2}N_{1.72}$; as well as the oxynitride-carbides of typical formula $Si_aSn_bC_cO_yN_z$ with $a>0$, $b>0$, $a+b\le 2$, $0<c<10$, $0<y<24$, $0<z<17$;

nitrides of the type $Si_xN_y$ (in particular with $x=3$ and $y=4$), $Sn_xN_y$ (in particular with $x=3$ and $y=4$), $Zn_xN_y$ (in particular with $x=3$ and $y=2$), $Li_{3-x}M_xN$ (with $0\le x\le 0.5$ for M=Co, $0\le x\le 0.6$ for M=Ni, $0\le x\le 0.3$ for M=Cu); $Si_{3-x}M_xN_4$ with M=Co or Fe and $0\le x\le 3$.

oxides $SnO_2$, SnO, $Li_2SnO_3$, $SnSiO_3$, $Li_xSiO_y$ ($x\ge 0$ and $2>y>0$), $Li_4Ti_5O_{12}$, $TiNb_2O_7$, $Co_3O_4$, $SnB_{0.6}P_{0.4}O_{2.9}$ and $TiO_2$, composite oxides $TiNb_2O_7$ comprising between 0% and 10% carbon by weight, preferably carbon being chosen from graphene and the carbon nanotubes.

3. Manufacture of Batteries that Use the Electrodes According to the Invention Porous electrodes according to the invention can be coated or not with a dielectric layer by ALD or by CSD. These electrodes coated or not can then be covered with a porous layer playing the role of a separator in such a way that there is, between each electrode coated or not with a dielectric layer by ALD or by CSD, a porous layer. In an embodiment, the material used for the manufacture of this porous layer playing the role of a separator is chosen from the inorganic materials with a low melting point, electrical insulator and stable in contact with electrodes during the steps of hot pressing. The more refractory the materials are, the more it will be necessary to heat at high temperatures thus risking modifying the interfaces with the electrode materials, in particular by interdiffusion, which generates parasite reactions and creates depletion layers of which the electrochemical properties differ from those that are found in the same material at a greater depth from the interface.

The material used for the manufacture of porous layers playing the role of a separator is preferably inorganic. In a particular embodiment, the material used for the manufacture of this porous layer playing the role of a separator is an electrically insulating material. It can, preferably be chosen from $Al_2O_3$, $SiO_2$, $ZrO_2$.

Alternatively, the material used for the manufacture of this porous layer playing the role of separator can be an ionic conductor material such as a solid electrolyte.

According to the invention the solid electrolyte material used to manufacture a porous layer playing the role of separator can be chosen in particular from:

garnets of formula $Li_d A^1_x A2_y(TO_4)_z$ where
  $A^1$ represents a cation of oxidation state +II, preferably Ca, Mg, Sr, Ba, Fe, Mn, Zn, Y, Gd; and where
  $A^2$ represents a cation of oxidation state +III, preferably Al, Fe, Cr, Ga, Ti, La; and where
  $(TO_4)$ represents an anion wherein T is an atom of oxidation state +IV, located at the center of a tetrahedron formed by the oxygen atoms, and wherein $TO_4$ advantageously represents the silicate or zirconate anion, knowing that all or a portion of the elements T of an oxidation state +IV can be replaced by atoms of an oxidation state +III or +V, such as Al, Fe, As, V, Nb, In, Ta;
  knowing that: d is comprised between 2 and 10, preferably between 3 and 9, and even more preferably between 4 and 8; x is comprised between 2.6 and 3.4 (preferably between 2.8 and 3.2); y is comprised between 1.7 and 2.3 (preferably between 1.9 and 2.1) and z is comprised between 2.9 and 3.1;
garnets, preferably chosen from: —$Li_7La_3Zr_2O_{12}$; —$Li_6La_2BaTa_2O_{12}$; $Li_{5.5}La_3Nb_{1.75}In_{0.25}O_{12}$; $Li_5La_3M_2O_{12}$ with M=Nb or Ta or a mixture of the two compounds; $Li_{7-x}Ba_xLa_{3-x}M_2O_{12}$ with 0≤x≤1 and M=Nb or Ta or a mixture of the two compounds; $Li_{7-x}La_3Zr_{2-x}M_xO_{12}$ with 0≤x≤2 and M=Al, Ga or Ta or a mixture of two or three of these compounds;
lithium phosphates, preferably chosen from: lithium phosphates of the NaSICON type, $Li3PO_4$; $LiPO_3$; $Li_3Al_{0.4}Sc_{1.6}(PO_4)_3$ called "LASP"; $Li1,2Zr_{1.9}Ca_{0.1}(PO_4)_3$; $LiZr_2(PO_4)_3$; $Li_{1+3x}Zr_2(P_{1-x}Si_xO_4)_3$ with 1.8<x<2.3; $Li_{1+6x}Zr_2(P_{1-x}B_xO_4)_3$ with 0≤x≤0.25; $Li_3(Sc_{2-x}M_x)(PO_4)_3$ with M=Al or Y and 0≤x≤1; $Li_{1+x}M_x(Sc)_{2-x}(PO_4)_3$ with M=Al, Y, Ga or a mixture of the three compounds and 0≤x≤0.8; $Li_{1+x}M_x(Ga_{1-y}Sc_y)_{2-x}(PO_4)_3$ with 0≤x≤0.8; 0≤y≤1 and M=Al or Y or a mixture of the two compounds; $Li_{1+x}M_x(Ga)_{2-x}(PO_4)_3$ with M=Al, Y or a mixture of the two compounds and 0≤x≤0.8; $Li_{1+x}Al_xTi_{2-x}(PO_4)_3$ with 0≤x≤1 called "LATP"; or $Li_{1+x}Al_xGe2-x(PO4)_3$ with 0≤x≤1; or $Li_{1+x+z}M_x(Ge_{1-y}Ti_y)_{2-x}Si_zP_{3-z}O_{12}$ with 0≤x≤0.8 and 0≤y≤1.0 & 0≤z≤0.6 and M=Al, Ga or Y or a mixture of two or three of these compounds; $Li_{3+y}(Sc_{2-x}M_x)Q_yP_{3-y}O_{12}$, with M=Al and/or Y and Q=Si and/or Se, 0≤x≤0.8 and 0≤y≤1; or $Li_{1+x+y}M_xSc_{2-x}Q_yP_{3-y}O_{12}$, with M=Al, Y, Ga or a mixture of the three compounds and Q=Si and/or Se, 0≤x≤0.8 and 0≤y≤1; or $Li_{1+x+y+z}M_x(Ga_{1-y}Sc_y)_{2-x}Q_zP_{3-z}O_{12}$ with 0≤x≤0.8; 0≤y≤1; 0≤z≤0.6 with M=Al or Y or a mixture of the two compounds and Q=Si and/or Se; or $Li_{1+x}Zr_{2-x}B_x(PO_4)_3$ with 0≤x≤0.25; or $Li_{1+x}Zr_{2-x}Ca_x(PO_4)_3$ with 0≤x≤0.25; or $Li_{1+x}M^3_xM_{2-x}P_3O_{12}$ with 0≤x≤1 and $M^3$=Cr, V, Ca, B, Mg, Bi and/or Mo, M=Sc, Sn, Zr, Hf, Se or Si, or a mixture of these compounds;

lithium borates, preferably chosen from: $Li_3(Sc_{2-x}M_x)(BO_3)_3$ with M=Al or Y and 0≤x≤1; $Li_{1+x}M_x(Sc)_{2-x}(BO_3)_3$ with M=Al, Y, Ga or a mixture of the three compounds and 0≤x≤0.8; $Li_{1+x}M_x(Ga_{1-y}Sc_y)_{2-x}(BO_3)_3$ with 0≤x≤0.8, 0≤y≤1 and M=Al or Y; $Li_{1+x}M_x(Ga)_{2-x}(BO_3)_3$ with M=Al, Y or a mixture of the two compounds and 0≤x≤0.8; $Li_3BO_3$, $Li_3BO_3$—$Li_2SO_4$, $Li_3BO_3$—$Li_2SiO_4$, $Li_3BO_3$—$Li_2SiO_4$—$Li_2SO_4$;

oxinitrides, preferably chosen from $Li_3PO_{4-x}N_{2x/3}$, $Li_4SiO_{4-x}N_{2x/3}$, $Li_4GeO_{4-x}N_{2x/3}$ with 0<x<4 or $Li_3BO_{3-x}N_{2x/3}$ with 0<x<3;

lithium compounds based on lithium oxinitride and phosphorus, called "LiPON", in the form $Li_xPO_yN_z$ with x ~2.8 and 2y+3z ~7.8 and 0.16≤z≤0.4, and in particular $Li_{2.9}PO_{3.3}N_{0.46}$, but also the compounds $Li_wPO_xN_yS_z$ with 2x+3y+2z=5=w or the compounds $Li_wPO_xN_yS_z$ with 3.2≤x≤3.8, 0.13≤y≤0.4, 0≤z≤0.2, 2.9≤w≤3.3 or the compounds in the form of $Li_tP_xAl_yO_uN_vS_w$ with 5x+3y=5, 2u+3v+2w=5+t, 2.95≤t≤3.3, 0.84≤x≤0.94, 0.094≤y≤0.26, 3.2≤u≤3.8, 0.13≤v≤0.46, 0≤w≤0.2;

materials based on lithium phosphorus or boron oxinitrides, respectively called "LiPON" and "LIBON", also able to contain silicon, sulfur, zirconium, aluminum, or a combination of aluminum, boron, sulfur and/or silicon, and boron for the materials based on lithium phosphorus oxinitrides;

lithium compounds based on lithium, phosphorus and silicon oxinitride called "LiSiPON", and particularly $Li_{1.9}Si_{0.28}P_{1.0}O_{1.1}N_{1.0}$;

lithium oxinitrides of the LiBON, LiBSO, LiSiPON, LiSON, thio-LiSiCON, LiPONB types (where B, P and S represent boron, phosphorus and sulfur respectively);

lithium oxinitrides of the LiBSO type such as (1-x) $LiBO_2$-x$Li_2SO_4$ with 0.4□x□0.8:

lithium oxides, preferably chosen from $Li_7La_3Zr_2O_{12}$ or $Li_{5+x}La_3(Zr_x,A_{2-x})O_{12}$ with A=Sc, Y, Al, Ga and 1.4≤x≤2 or $Li_{0.35}La_{0.55}TiO_3$ or $Li3xLa_{2/3-x}TiO_3$ with 0≤x≤0.16 (LLTO);

silicates, preferably chosen from $Li_2Si_2O_5$, $Li_2SiO_3$, $Li_2Si_2O_6$, $LiAlSiO_4$, $Li_4SiO_4$, $LiAlSi_2O_6$;

solid electrolytes of the anti-perovskite type chosen from: $Li_3OA$ with A a halide or a mixture of halides, preferably at least one of the elements chosen from F, Cl, Br, I or a mixture of two or three or four of these elements; $Li_{(3-x)}M_{x/2}OA$ with 0<x≤3, M a divalent metal, preferably at least one of the elements Mg, Ca, Ba, Sr or a mixture of two or three or four of these elements, A a halide or a mixture of halides, preferably at least one of the elements F, Cl, Br, I or a mixture of two or three or four of these elements; $Li_{(3-x)}M^3_{x/3}OA$ with 0≤x≤3, $M^3$ a trivalent metal, A a halide or a mixture of halides, preferably at least one of the elements F, Cl, Br, I or a mixture of two or three or four of these elements; or $LiCOX_zY_{(1-z)}$, with X and Y halides such as mentioned hereinabove in relation with A, and 0≤z≤1;

the compounds $La_{0.51}Li_{0.34}Ti_{2.94}$, $Li_{3.4}V_{0.4}Ge_{0.6}O_4$, $Li_2O$—$Nb_2O_5$, $LiAlGaSPO_4$;

formulations based on $Li_2CO_3$, $B_2O_3$, $Li_2O$, $Al(PO_3)_3LiF$, $P_2S_3$, $Li_2S$, $Li_3N$, $Li_{14}Zn(GeO_4)_4$, $Li_{3.6}Ge_{0.6}V_{0.4}O_4$, $LiTi_2(PO_4)_3$, $Li_{3.25}Ge_{0.25}P_{0.25}S_4$, $Li_{1.3}Al_{0.3}Ti_{1.7}(PO_4)_3$, $Li_{1+x}Al_xM_{2-x}(PO_4)_3$ (where M=Ge, Ti, and/or Hf, and where 0<x<1), $Li_{1+x+y}Al_xTi_{2-x}Si_yP_{3-y}O_{12}$ (where 0≤x≤1 and 0≤y≤1).

Advantageously, the porous layer playing the role of a separator can be deposited, in the same way as the electrode layer on their support, electrophoretically, by dip-coating, by ink-jet or by doctor blade, by roll coating, by curtain coating from a suspension of nanoparticles.

Preferably, the electrodes according to the invention are covered with a porous layer playing the role of a separator then stacked in such a way that these porous layers are in contact.

This stack comprising an alternating succession of cathodes and anodes, preferably in thin layers covered with a porous layer is then vacuum hot pressed, with the understanding that at least one cathode or one anode according to the invention is used in this stack. The pressure and the temperature used during the hot pressing of the stack allowing for the creation of the assembly depend in particular on the nature of the materials comprising the stack and the size of the primary particles used for carrying out the electrodes and the porous layer playing the role of a separator.

Advantageously, the stack is placed under a pressure comprised between 0.5 MPa and 3 MPa, preferably about 1.5 MPa then is vacuum dried. This makes it possible to maintain the stack during drying. The platens of the press are then heated to a setpoint temperature, preferably 450° C. with a speed of a few degrees ° C. per second. At 450° C., the stack is then thermo-compressed under a pressure that allows for the assembly of the stack, preferably 45 MPa for 1 minute, then the system is cooled to ambient temperature.

Once the assembly is carried out, a rigid, multilayer system formed from one or more assembled cells is obtained.

In an advantageous embodiment a very thin dielectric layer (i.e. an electronic insulator) is applied, covering and preferably without defects, on this thermo-compressed stack. This makes it possible to cover in a single treatment all of the surfaces of the anodes 12, cathodes 22 and/or porous layers 13, 23 playing the role of a separator with a very thin dielectric layer (i.e. an electronic insulator), covering and preferably without defects. In addition to passivating the surface of the electrodes, this treatment makes it possible to cover only the accessible surfaces of the mesoporous structure, i.e. the surfaces that will layer be in contact with the electrolytes.

This deposition improves the performance of lithium-ion batteries including at least one porous electrode according to the invention. The improvement observed consists substantially in a reduction of the faradic reactions at the interface between the electrolyte and the electrode.

Very advantageously this deposition is carried out by a technique allowing for a covering coating (also called conformal deposition), i.e. a deposition that faithfully reproduces the atomic topography of the substrate on which it is applied. The ALD (Atomic Layer Deposition) or CSD (Chemical Solution Deposition) techniques, known as such, can be suitable. These deposition techniques by ALD and by CSD make it possible to carry out a coating that lines the entire surface of the electrodes. This covering coating typically has a thickness less than 5 nm, preferably comprised between 1 nm and 5 nm.

The all-solid-state architecture, without organic materials, of the batteries comprising an electrode according to the invention, resists high temperatures and is compatible with the deposition methods by ALD.

The dielectric layer applied on the thermo-compressed stack to protect and passivate the accessible surfaces of this stack can be for example silica, zirconia, alumina $Al_2O_3$. This dielectric layer can also be an ionic conductor, which advantageously has an electronic conductivity less than $10^{-8}$ S/cm. This material has to be chosen in such a way as to not insert, at the operating voltages of the battery, lithium but only to transport it. For this can be used for example $Li_3PO_4$, $Li_3BO_3$, lithium lanthanum zirconium oxide (called LLZO), such as $Li_7La_3Zr_2O_{12}$, that have a wide range of operating potential.

Figure 4:
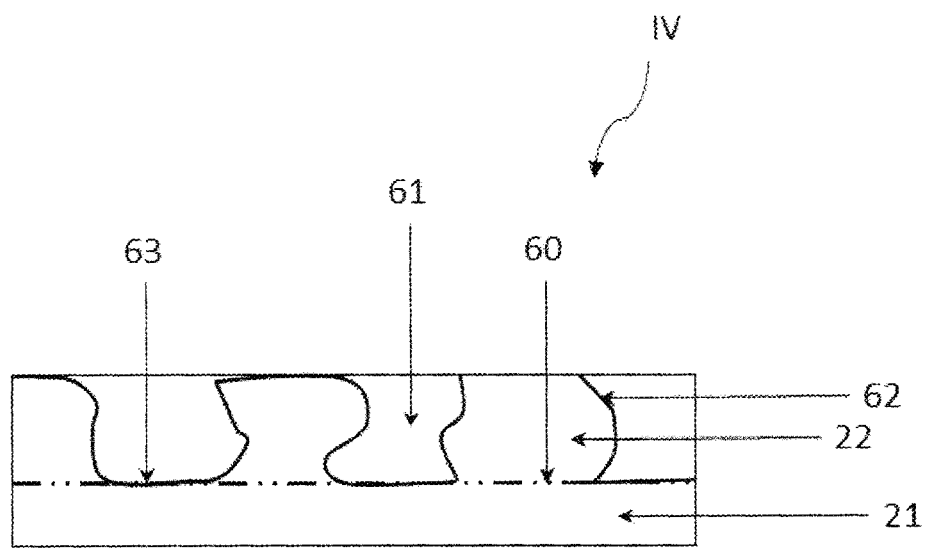
FIG. 4 is a front view with pulling-off of a battery, showing on a larger scale the detail IV of a porous electrode dispersed on a substrate used as a current collector.

However, as shown in FIG. 4, the dielectric layer 62, 63 applied by ALD or CSD on the thermo-compressed stack only covers the surface of the porous deposition and a portion of the surface of the current collector.

The dielectric layer applied by ALD or CSD on the thermo-compressed stack, of a thickness less than 5 nm, does not prevent the passage of electrons. As the electrode is partially sintered, the electrons pass through the welding (necking) between the particles of electrode material. The "weld" zone 60 between the mesoporous deposition and the substrate is not covered by the dielectric layer.

The dielectric layer applied by ALD or CSD covers only the free surfaces of pores 61, in particular the accessible surfaces of the electrodes 22 and those of the substrate 21.

The materials used to create this dielectric layer, are particularly effective for blocking the electrochemical reactions of dissolution. In addition the insulating depositions made by ALD or CSD are particular effective when it entails protection against corrosion. They are of course of a thin thickness, but entirely covering, without defects.

The dielectric layer can be formed from a stack of thin films, forming a multilayer structure. These thin films can be of a different chemical nature so as to form a multilayer and multi-material structure. Moreover, the performance against corrosion of the dielectric layer is all the better when it is formed from a stack of thin films, preferably, formed from a stack of thin films forming a multilayer and multi-material structure. For example, a dielectric layer comprising a film of 2 nm of $Al_2O_3$ and a film of 2 nm of $ZrO_2$ is more effective than a dielectric layer comprising a single film of 4 nm of $Al_2O_3$.

The dielectric layer, whether it is thick and/or of a multilayer structure, makes it possible to perfectly protect the substrate from the corrosion induced by the use of liquid electrolytes, without harming the passage of electrons.

At the interfaces only the lithium ions must pass, not the electrons. Ion-conducting insulators such as $Li_3PO_4$ can be used as a dielectric layer with greater thicknesses, preferably between 1 and 5 nm, without affecting the operation of the battery. A dielectric layer with a multilayer structure can also be deposited by ALD or by CSD, comprising a first layer deposited on the thermo-compressed stack of an ion-conducting insulator material such as a solid electrolyte of a thickness preferably comprised between 1 and 5 nm, and of a second layer deposited on this first layer of an ion and electronic insulator material and having a very thin thickness, ideally less than 1 nm in order to not make the battery excessively resistive.

This assembly, coated or not with a dielectric layer, can then be impregnated with a phase carrying lithium ions, preferably in an electrolytic solution.

4. Impregnation of the Assembled Battery, and More Particularly of the Layers of Electrodes and of the Separator of the Battery Once the assembly of a stack forming a battery by hot pressing is completed, it can be impregnated with a phase carrying lithium ions. This phase can be a solution formed by a lithium salt dissolved in an organic solvent or a mixture of organic solvents, and/or dissolved in a polymer containing at least one lithium salt, and/or dissolved in an ionic liquid (i.e. a melted lithium salt) containing at least one lithium salt. This phase can also be a solution formed from a mixture of these components. The inventors have found that the porous electrodes according to the invention are able to absorb a liquid phase by simple capillarity. This entirely unexpected effect is specific to the depositions of porous, preferably mesoporous, electrodes according to the invention; it is particularly favored when the average diameter $D_{50}$ of the pores is between 2 nm and 80 nm, preferably between 2 nm and 50 nm, preferably between 6 nm and 30 nm, preferably between 8 nm and 20 nm. The pores of this assembly, preferably when it is made from ceramic materials, can easily be wetted by an ionic liquid, by mixtures of ionic liquids or by a solution comprising at least 50% by weight of at least one ionic liquid diluted with an organic solvent or diluted with a mixture of organic solvents. Its pores are impregnated with the phase carrying lithium ions, i.e. by an electrolyte, such as an ionic liquid containing lithium salts, possibly diluted with an organic solvent or a mixture of organic solvents containing a lithium salt that can be different from the one dissolved in the ionic liquid.

The impregnation can be done either for the anode, or for the cathode, or for both at the same time.

In an advantageous embodiment of the invention, the porous, preferably mesoporous electrode, has a porosity greater than 30% by volume, pores of an average diameter Do less than 80 nm, preferably less than 50 nm, a primary diameter of particles less than 30 nm. Its thickness is advantageously less than 100 µm, less than 50 µm, less than 10 µm, and preferably comprised between 2.5 µm and 4.5 µm, so as to reduce the final thickness of the battery. It is binder-free.

Advantageously, the porous electrode, preferably in a thin layer, has a porosity comprised between 35% and 50% by volume, and more preferably between 40% and 50% by volume; it is preferably mesoporous.

In an advantageous embodiment of the invention, the porous layer playing the role of separator, has a porosity greater than 30% by volume, pores of an average diameter Do less than 50 nm. This porous layer playing the role of a separator is able to absorb a liquid phase such as a phase carrying lithium ions via simple capillarity in its pores. This effect is particularly favored when the average diameter $D_{50}$ of the mesopores is between 2 nm and 50 nm, preferably between 6 nm and 30 nm, preferably between 8 nm and 20 nm. Its thickness is advantageously less than 10 nm. It is binder-free. Advantageously, the porosity of the porous layer playing the role of a separator is comprised between 35% and 50% by volume, and more preferably between 40% and 50% by volume; it is preferably mesoporous.

The "nanoconfined" or "nanotrapped" liquid in the porosities, preferably in the mesoporosities, can no longer exit. It is linked by a phenomenon here called "absorption in the mesoporous structure" (which does not seem to have been described in the literature in the context of lithium-ion batteries) and can no longer exit even when the cell is placed in a vacuum. The battery is then considered as quasi-solid.

The phase carrying lithium ions, can be an ionic liquid containing lithium salts, possibly diluted with an organic solvent or a mixture of organic solvents containing a lithium salt that can be different from the one dissolved in the ionic liquid.

The ionic liquid is formed from a cation associated with an anion; this anion and this cation are chosen in such a way that the ionic liquid is in the liquid state in the operating temperature range of the accumulator. The ionic liquid has the advantage of having a high thermal stability, a reduced flammability, of being non-volatile, of being little toxic and a good wettability of ceramics, which are materials that can be used as electrode materials. Surprisingly, the percentage by weight of ionic liquid contained in the phase carrying lithium ions can be greater than 50%, preferably greater than 60% and even more preferably greater than 70%, and this contrary to the lithium-ion batteries of the prior art where the percentage by weight of ionic liquid in the electrolyte must be less than 50% by weight in order for the battery to retain a capacity and a voltage that are high in discharge as well as good stability in cycling. Beyond 50% by weight the capacity of the battery of the prior art degrades, as indicated in application US 2010/209 783 A1. This can be explained by the presence of polymer binders within the electrolyte of the battery of the prior art; these binders are slightly wetted by the ionic liquid inducing a poor ion conduction within the phase carrying lithium ions thus causing a degradation in the capacity of the battery.

The batteries using a porous electrode according to the invention are, preferably, binder-free. Because of this, these batteries can use a phase carrying lithium ions comprising more than 50% by weight of at least one ionic liquid without degrading the final capacity of the battery.

The phase carrying lithium ions can comprise a mixture of several ionic liquids.

Advantageously, the ionic liquid can be a cation of the type 1-Ethyl-3-methylimidazolium (also called EMI+) and/or n-propyl-n-methylpyrrolidinium (also called $PYR_{13}^+$) and/or n-butyl-n-methylpyrrolidinium (also called $PYR_{14}^+$), associated with anions of the type bis (trifluoromethanesulfonyl)imide ($TFSI^-$) and/or bis(fluorosulfonyl)imide ($FSI^-$). To form an electrolyte, a lithium salt such as LiTFSI can be dissolved in the ionic liquid which is used as a solvent or in a solvent such as γ-butyrolactone. γ-butyrolactone prevents the crystallization of the ionic liquids inducing an operating range in temperature of the latter that is greater, in particular at low temperature.

The phase carrying lithium ions can be an electrolytic solution comprising PYR14TFSI and LiTFSI; these abbreviations will be defined hereinbelow.

Advantageously, when the porous anode or cathode comprises a lithium phosphate, the phase carrying lithium ions comprises a solid electrolyte such as $LiBH_4$ or a mixture of $LiBH_4$ with one or more compounds chosen from LiCl, LiI and LiBr. $LiBH_4$ is a good conductor of lithium and has a low melting point that facilitates the impregnation thereof in the porous electrodes, in particular by dipping. Due to is extremely reducing properties, $LiBH_4$ is little used as an electrolyte. Using a protective film on the surface of porous lithium phosphate electrodes prevents the reduction in electrode materials, in particular cathode materials, by $LiBH_4$ and prevents degradation of the electrodes.

Advantageously, the phase carrying lithium ions comprises a least one ionic liquid, preferably at least one ionic liquid at ambient temperature, such as PYR14TFSI, possibly diluted in at least one solvent, such as γ-butyrolactone.

Advantageously, the phase carrying lithium ions comprises between 10% and 40% by weight of a solvent, preferably between 30 and 40% by weight of a solvent, and even more preferably between 30 and 40% by weight of γ-butyrolactone.

Advantageously the phase carrying lithium ions comprises more than 50% by weight of at least one ionic liquid and less than 50% solvent, which limits the risks of safety and of ignition in case of malfunction of the batteries comprising such a phase carrying lithium ions.

Advantageously, the phase carrying lithium ions comprises:
   between 30 and 40% by weight of a solvent, preferably between 30 and 40% by weight of γ-butyrolactone, and
   more than 50% by weight of at least one ionic liquid, preferably more than 50% by weight of PYR14TFSI.

The phase carrying lithium ions can be an electrolytic solution comprising PYR14TFSI, LiTFSI and γ-butyrolactone, preferably an electrolytic solution comprising about 90% by weight of PYR14TFSI, 0.7 M of LiTFSI and 10% by weight of γ-butyrolactone.

After impregnation by a liquid phase carrying lithium ions, the assembly is dried, preferably, by a curtain of $N_2$ leading to the obtaining of a lithium-ion battery comprising at least one, preferably several electrochemical cells, with each one comprising electrodes according to the invention.

We shall describe here the carrying out of a battery with a separator with a solid electrolyte base, with a base of $Li_3Al_{0.4}Sc_{1.6}(PO_4)_3$. The mesoporous cathode layers ($LiMn_2O_4$) are created, coated with a mesoporous layer of $Li_3Al_{0.4}Sc_{1.6}(PO_4)_3$, and the mesoporous anode layer ($Li_4Ti_5O_{12}$), also coated with a mesoporous layer of $Li_3Al_{0.4}Sc_{1.6}(PO_4)_3$.

The suspension of nanoparticles of electrolyte material is prepared hydrothermally, which directly leads to nanoparticles with good crystallinity. The electrolyte layer is deposited electrophoretically, by ink-jet, by doctor blade, by roll coating, by curtain coating or by dip-coating on the cathode layer and/or on the anode layer, described hereinabove, whether or not coated beforehand with a dielectric layer deposited by ALD. The assembly is done by hot pressing, under an inert atmosphere, at a temperature comprised between 300° C. and 500° C., preferably between 350° C. and 450° C. and a pressure between 50 MPa and 100 MPa, for example at 350° C. and 100 MPa.

Then, this cell, which is entirely solid and rigid, and which does not contain any organic material, is impregnated by immersion in a lithium-ion-conducting liquid electrolyte. Due to the open porosity and the small size of the porosities (less than 50 nm), the impregnation in the entire cell (electrode and separator made of mesoporous $Li_3Al_{0.4}Sc_{1.6}(PO_4)_3$) is done via capillarity. The liquid electrolyte can be for example $LiPF_6$ or $LiBF_4$ dissolved in an aprotic solvent, or an ionic liquid containing lithium salts. The ionic liquids and organic electrolytes can also be mixed. It is possible for example to mix at 50% by weight $LiPF_6$ dissolved in EC/DMC with an ionic liquid containing lithium salts of the type LiTFSI:PYR14TFSI 1:9 mol. Mixtures of ionic liquids can also be made that can operate at low temperature such as for example the mixture LiTFSI:PYR13FSI:PYR14TFSI (2:9:9 mol ratio).

EC is the common abbreviation of ethylene carbonate (CAS no.: 96-49-1). DMC is the common abbreviation of dimethyl carbonate (CAS no.: 616-38-6). LiTFSI is the common abbreviation of lithium bis-trifluoromethanesulfonimide (CAS no.: 90076-65-6). PYR13FSI is the common abbreviation of N-Propyl-N-Methylpyrrolidinium bis(fluorosulfonyl)imide. PYR14TFSI is the common abbreviation of 1-butyl-1-methylpyrrolidinium bis(trifluoro-methanesulfonyl)imide.

We describe here another example of manufacturing a lithium-ion battery according to the invention. This method comprises the steps of:
   (1) Providing a colloidal suspension comprising aggregates or agglomerates of nanoparticles of at least one cathode material with an average primary diameter $D_{50}$ less than or equal to 50 nm;
   (2) Providing a colloidal suspension comprising aggregates or agglomerates of nanoparticles of at least one anode material with an average primary diameter $D_{50}$ less than or equal to 50 nm.
   (3) Providing of at least two flat conducting substrates, preferably metal, said conducting substrates can be used as current collectors of the battery,
   (4) Deposition of at least one layer of cathode, respectively anode, by dip-coating, by ink-jet, by doctor blade, by roll coating, by curtain coating or by electrophoresis, preferably by pulsed-current galvanostatic electrodeposition, from said suspension of nanoparticles of material provided in step (1), respectively in step (2), on said substrate provided in step (3),
   (5) Drying the layer thus obtained in the step (4),
   (6) Optionally, deposition by ALD of a layer of electrically-insulating material on and inside pores of the layer of cathode, and/or of anode in step (5),
   (7) Deposition, preferably by electrophoresis, by dip-coating, by ink-jet, by doctor blade, by roll coating or by curtain coating, of a film, preferably porous, preferably mesoporous, of an electrically-insulating material or of an ion-conducting material or of an electrically-insulating material possibly ion-conducting from a colloidal suspension of nanoparticles of this aggregated or agglomerated material of average primary diameter $D_{50}$ less than or equal to 50 nm and of an average diameter $D_{50}$ of about 100 nm on the layer of cathode, respectively anode obtained in step (5) and/or step (6),
   (8) Drying the layer thus obtained in the step (7),
   (9) Realization of a stack comprising an alternating succession of layers of cathode and anode, preferably offset laterally,
   (10) Hot pressing of the layers of anode and cathode obtained in step (9) in such a way as to juxtapose the films obtained in step (8) present on the layers of anode and cathode, and to obtain an assembled stack,
   (11) Optionally, deposition by ALD of a layer of electronically-insulating material on the thermo-compressed stack obtained in step (10),
   (12) Impregnation of the structure obtained in step (10) by a phase carrying lithium ions leading to the obtaining of an impregnated structure, preferably a cell.

The order of steps (1), (2) and (3) is not important.

A lithium-ion battery cell with very high power density is thus obtained. The "nanoconfined" or "nanotrapped" liquid in the mesoporosities can no longer exit as indicated hereinabove; the battery is then considered as quasi-solid.

It is preferred to deposit by ALD a layer of electronically-insulating material on the thermo-compressed stack (i.e. thermo-assembly stack) obtained in step (10) than to carry out this deposition in step (6); it is simpler to carry out the deposition by ALD of a layer of electronically-insulating material on a thermo-compressed stack than to carry it out on each electrode separately.

We describe here the manufacture of a lithium-ion battery that is suitable for use at low temperature. As indicated hereinabove, the series resistance of a battery increases when the temperature drops. For an all-solid-state lithium-ion battery (such as described for example in patent applications WO2013/064 781 or WO 2013/064 779), the ionic conductivity of the electrolyte decreases about by half when the temperature drops 7° C. To resolve this problem a battery according to the invention is used with mesoporous electrodes, a porous layer, preferably mesoporous playing the role of a separator, that is impregnated by an electrolyte which is, preferably, an ionic liquid including lithium ions; the ionic liquid can be diluted by adding a suitable organic solvent. It is for example possible to use a mixture at 50% by weight of LiPFs in EC/DMC with LiTFSI:PYR14TFSI 1:9 mol or use an electrolytic solution comprising 90% by weight of PYR14TFSI, 0.7 M of LiTFSI and 10% by weight of γ-butyrolactone. The impregnation is done after assembly of a stack comprising an alternating succession of layers of cathode and anode covered with a porous layer playing the role of separator, such as just been described, after the step (11).

For example, the deposition of electrodes, either of the anode, or of the cathode, or, what is preferred, of both, can be done with aggregated or agglomerated nanoparticles with an average diameter $D_{50}$ of about 100 nm, obtained from primary nanoparticles of an average diameter $D_{50}$ less than or equal to 50 nm; each electrode can have a thickness of about 4 µm.

The method according to the invention can be used for the manufacture of porous or mesoporous electrodes, in particular as a thin layer or as a thicker layer of about 50 µm or 100 µm, in thickness, in electronic, electric or electrotechnical devices, and preferably in devices selected from the group formed by: batteries, capacitors, supercapacitors, capacitors, resistors, inductances, transistors, photovoltaic cells.

5. Encapsulation

The battery or the assembly, multilayer rigid system formed by one or more assembled cells, covered or not with a dielectric layer, possibly impregnated by a phase carrying lithium ions, must then be encapsulated by a suitable method in order to ensure the protection thereof from the atmosphere. The encapsulation system 30 comprises at least one layer, and preferably represents a stack of several layers. If the encapsulation system 30 is composed of a single layer, it must be deposited by ALD or be made of parylene and/or polyimide. These encapsulation layers have to be chemically stable, resist high temperatures and be impermeable to the atmosphere (barrier layer). One of the methods described in patent applications WO 2017/115 032, WO 2016/001584, WO016/001588 or WO 2014/131997 can be used. Preferably, said at least one encapsulation layers covers four of the six faces of said battery, the two other faces of the battery being covered by the terminations.

Advantageously, the battery or the assembly, can be covered with an encapsulation system 30 formed by a stack of several layers, namely a sequence, preferably z sequences, comprising:
- a first covering layer, preferably chosen from parylene, parylene of the F type, polyimide, epoxy resins, silicone, polyamide and/or a mixture of the latter, deposited on the stack of anode and cathode foils,
- a second covering layer comprised of an electrically-insulating material, deposited by atomic layer deposition on said first covering layer.

This sequence can be repeated z times with z≥1. This multilayer sequence has a barrier effect. The more the sequence of the encapsulation system is repeated, the more substantial this barrier effect will be. It will be as substantial as the thin layers deposited are numerous.

Advantageously, the first covering layer is a polymer layer, for example made of silicone (deposited for example by impregnation or by plasma-assisted chemical vapor deposition from hexamethyldisiloxane (HMDSO)), or epoxy resin, or polyimide, polyamide, or poly-para-xylylene (more commonly known as parylene), preferably with a polyimide and/or parylene base. This first covering layer makes it possible to protect the sensitive elements of the battery from its environment. The thickness of said first covering layer is, preferably, comprised between 0.5 µm and 3 µm.

Advantageously, the first covering layer can be parylene of the C type, parylene of the D type, parylene of the N type (CAS 1633-22-3), parylene of the F type or a mixture of parylene of the C, D, N and/or F type. Parylene (also called polyparaxylylene or poly(p-xylylene)) is a dielectric, transparent, semi-crystalline material that has high thermodynamic stability, excellent resistance to solvents as well as very low permeability. Parylene also has barrier properties that make it possible to protect the battery from its external environment. The protection of the battery is increased when this first covering layer is made from parylene of the F type. It can be vacuum deposited, by a chemical vapor deposition technique (CVD). This first encapsulation layer is advantageously obtained from the condensation of gaseous monomers deposited by chemical vapor deposition technique (CVD) on the surfaces, which makes it possible to have a conformal, thin and uniform covering, of all of the accessible surfaces of the stack. It makes it possible to follow the variations in volume of the battery during the operation thereof and facilitates the specific cutting of batteries through its elastic properties. The thickness of this first encapsulation layer is comprised between 2 µm and 10 µm, preferably comprised between 2 µm and 5 µm and even more preferably about 3 µm. It makes it possible to cover all of the accessible surfaces of the stack, to close only on the surface the access to the pores of these accessible surfaces and to render uniform the chemical nature of the substrate. The first covering layer does not enter into the pores of the battery or of the assembly, as the size of the deposited polymers is too large for them to enter the pores of the stack.

This first covering layer is advantageously rigid; it cannot be considered as a flexible surface. The encapsulation can thus be carried out directly on the stacks, the coating able to penetrate into all the available cavities. It is reminded here that thanks to the absence of binder in the porosities of the electrodes according to the invention and/or of the electrolyte, the battery can undergo vacuum treatments.

In an embodiment a first layer of parylene is deposited, such as a layer of parylene C, of parylene D, a layer of parylene N (CAS 1633-22-3) or a layer comprising a mixture of parylene C, D, and/or N. Parylene (also called polyparaxylylene or poly(p-xylylene)) is a dielectric, transparent, semi-crystalline material that has high thermodynamic stability, excellent resistance to solvents as well as very low permeability.

This layer of parylene makes it possible to protect the sensitive elements of the battery from their environment. This protection is increased when this first encapsulation layer is made from parylene N. However, the inventors have observed that this first layer, when it has a parylene base, does not have sufficient stability in the presence of oxygen. When this first layer has a polyimide base, it does not have a sufficient seal, in particular in the presence of water. For these reasons a second layer is deposited which coats the first layer.

Advantageously, a second covering layer comprised of an electrically-insulating material, preferably inorganic, can be deposited by a conformal deposition technique, such as atomic layer deposition (ALD) on this first layer. Thus a conformal covering is obtained on all of the accessible surfaces of the stack covered beforehand with the first covering layer, preferably a first layer of parylene and/or polyimide; this second layer is preferably an inorganic layer.

The growth of the layer deposited by ALD is influenced by the nature of the substrate. A layer deposited by ALD on a substrate that has different zones of different chemical natures will have non-homogenous growth, that can generate a loss of integrity of this second protective layer.

The deposition techniques by ALD are particularly well suited for covering surfaces that have a high roughness entirely tight and conformal. They make it possible to realize conformal layers, defect-free, such as holes (layers referred to as "pinhole-free") and represent very good barriers. Their WVTR coefficient is extremely low. The WVTR coefficient (water vapor transmission rate) makes it possible to evaluate the permeance to steam of the encapsulation system. The lower the WVTR coefficient is, the tighter the encapsulation system is. For example, a layer of $Al_2O_3$ of 100 nm thick deposited by ALD has a permeation to steam of 0.00034 g/m²·d. The second covering layer can be made of a ceramic material, vitreous material or vitroceramic material, for example in form of oxide, of the $Al_2O_3$ type, of nitride, phosphates, oxynitride, or siloxane. This second covering layer has a thickness less than 200 nm, preferably comprised between 5 nm and 200 nm, more preferably comprised between 10 nm and 100 nm, between 10 nm and 50 nm, and even more preferably of about fifty nanometers. A conformal deposition technique is preferred, such as atomic layer deposition (ALD).

This second covering layer deposited by ALD on the first polymer layer makes it possible on the one hand, to ensure the tightness of the structure, i.e. to prevent the migration of water inside the structure and on the other hand to protect the first covering layer, preferably of parylene and/or polyimide, preferably parylene of the F type, from the atmosphere, in particular from air and humidity, thermal exposures so as to prevent the degradation thereof. This second layer improves the service life of the encapsulated battery.

However, these layers deposited by ALD are very fragile mechanically and require a rigid support surface to ensure their protective role. The deposition of a fragile layer on a flexible surface would lead to the formation of cracks, generating a loss of integrity of this protective layer.

Advantageously, a third covering layer is deposited on the second covering layer or on an encapsulation system 30 formed by a stack of several layers as described hereinabove, namely a sequence, preferably z sequences of the encapsulation system with z≥1, to increase the protection of the battery cells from their external environment. Typically, this third layer is made of polymer, for example silicone (deposited for example by impregnation or plasma-assisted chemical vapor deposition from hexamethyldisiloxane (HMDSO)), or epoxy resin, or polyimide, or parylene.

Furthermore, the encapsulation system can comprise an alternating succession of layers of parylene and/or polyimide, preferably about 3 μm thick, and of layers comprised of an electrically-insulating material such as in organic layers conformally deposited by ALD as described hereinabove to create a multilayer encapsulation system. In order to improve the performance of the encapsulation, the encapsulation system can comprise a first layer of parylene and/or polyimide, preferably about 3 μm thick, a second layer comprised of an electrically-insulating material, preferably an inorganic layer, conformally deposited by ALD on the first layer, a third layer of parylene and/or polyimide, preferably about 3 μm thick deposited on the second layer and a fourth layer comprised of an electrically-insulating material conformally deposited by ALD on the third layer.

The battery or the assembly thus encapsulated in this sequence of the encapsulation system, preferably in z sequences, can then be covered with a last covering layer so as to mechanically protect the stack thus encapsulated and optionally provide it with an aesthetic aspect. This last covering layer protects and improves the service life of the battery. Advantageously this last covering layer is also chosen to resist a high temperature, and has a mechanical resistance that is sufficient to protect the battery during the later use thereof. Advantageously, the thickness of this last covering layer is comprised between 1 μm and 50 μm. Ideally, the thickness of this last covering layer is about 10-15 μm, such a range of thickness makes it possible to protect the battery from mechanical damage.

Advantageously, a last covering layer is deposited on an encapsulation system formed by a stack of several layers as described hereinabove, namely a sequence, preferably z sequences of the encapsulation system with z≥1, preferably on this alternating succession of layers of parylene or polyimide, preferably about 3 μm thick and of inorganic layers conformally deposited by ALD, in order to increase the protection of the battery cells from their external environment and protect them from mechanical damage. This last encapsulation layer has, preferably, a thickness of about 10-15 μm.

This last covering layer is preferably with a base of epoxy resin, polyethylene napthalate (PEN), polyimide, polyamide, polyurethane, silicone, sol-gel silica or organic silica. Advantageously, this last covering layer is deposited by dipping. Typically, this last layer is made of polymer, for example silicone (deposited for example by dipping or plasma-assisted chemical vapor deposition from hexamethyldisiloxane (HMDSO)), or epoxy resin, or polyimide, or parylene. For example, a layer of silicone (typical thickness of about 15 μm) can be deposited by injection in order to protect the battery from mechanical damage. The choice of such a material comes from the fact that it resists high temperatures and the battery can thus be assembled easily by welding on electronic boards without the appearance of vitreous transitions. Advantageously, the encapsulation of the battery is carried out on four of the six faces of the stack. The encapsulation layers surround the periphery of the stack, with the rest of the protection from the atmosphere being provided by the layers obtained by the terminations.

After the step of encapsulation, the stack thus encapsulated is then cut according to cut planes making it possible to obtain unit battery components, exposing on each one of the cutting planes anode and cathode connections 50 of the battery, in such a way that the encapsulation system 30 covers four of the six faces of said battery, preferably continuously, so that the system can be assembled without welding, with the other two faces of the battery being covered later by the terminations 40.

In an advantageous embodiment, the stack thus encapsulated and cut, can be impregnated, in an anhydrous atmosphere, by a phase carrying lithium ions such as an ionic liquid containing lithium salts, possibly diluted in an organic solvent or a mixture of organic solvents containing a lithium salt that can be different from the one dissolved in the ionic liquid, as presented in paragraph 10 of the present application. The impregnation can be carried out by dipping in an electrolytic solution such as an ionic liquid containing lithium salts, possibly diluted in an organic solvent or a mixture of organic solvents containing a lithium salt that can be different from the one dissolved in the ionic liquid. The ionic liquid enters instantly by capillarity in the porosities.

After the step of encapsulation, cutting and possibly impregnation of the battery, terminations 40 are added to establish the electrical contacts required for the proper operation of the battery.

6. Termination

Advantageously, the battery comprises terminations 40 at where the cathode, respectively anode, current collectors are apparent. Preferably, the anode connections and the cathode connections are on the opposite side of the stack.

On and around these connections 50 is deposited a termination system 40. The connections can be metalized using plasma deposition techniques known to those skilled in the art, preferably by ALD and/or by immersion in a conductive epoxy resin charged with silver and/or a molten bath of tin. Preferably, the terminations are formed from a stack of layers successively comprising a first thin electronically-conductive covering layer, preferably metal, deposited by ALD, a second epoxy resin layer charged with silver deposited on the first layer and a third layer with a tin base deposited on the second layer. the first conductive layer deposited by ALD is used to protect the section of the battery from humidity. This first conductive layer deposited by ALD is optional. It makes it possible to increased the calendar service life of the battery by reducing the WVTR at the termination. This first thin covering layer can in particular be metal or with a metal nitride base. The second layer made of epoxy resin charged with silver makes it possible to provide the "flexibility" for the connections without breaking the electrical contact when the electric circuit is subjected to thermal and/or vibratory stresses.

The third metallization layer with a tin base is used to ensure the weldability of the component.

In another embodiment, this third layer can be comprised of two layers of different materials. A first layer coming into contact with the epoxy resin layer charged with silver. This layer is made of nickel and is carried out by electrolytic deposition. The layer of nickel is used as a heat barrier and protects the rest of the component from the diffusion during the assembly steps by remelting. The last layer, deposited on the nickel layer is also a metallization layer, preferably made of tin in order to render the interface compatible with assemblies via remelting. This layer of tin can be deposited either by dipping in a molten tin bath or by electrodeposition; these techniques are known as such.

For certain assemblies on copper tracks by micro-wiring, it may be necessary to have a last metallization layer made of copper. Such a layer can be realized by electrodeposition in place of tin.

In another embodiment, the terminations 40 can be formed from a stack of layers successively comprising a layer made of epoxy resin charged with silver and a second layer with a tin or nickel base deposited on the first layer.

In another embodiment, the terminations 40 can be formed from a stack of layer that successively comprise a layer of conductive polymer such as a layer of epoxy resin charged with silver, a second layer with a nickel base deposited on the first layer and a third layer with a tin or copper base.

In a preferred embodiment, the terminations 40 can be formed from different layers which are respectively, in a non-limited manner, a conducting polymer layer such as an epoxy resin charged with silver, a nickel layer and a tin layer.

In another preferred embodiment, the terminations 40 are formed, at the edges of the cathode and anode connections, from a first stack of layers that successively comprise a first layer made from a material charged with graphite, preferably epoxy resin charged with graphite, and a second layer comprising metal copper obtained from an ink charged with nanoparticles of copper deposited on the first layer. This first stack of terminations is then sintered by infrared flash lamp in such a way as to obtain a covering of the cathode and anode connections by a layer of metal copper.

According to the final use of the battery, the terminations can comprise, additionally, a second stack of layers disposed on the first stack of the terminations successively comprising a first layer of a tin-zinc alloy deposited, preferably by dipping in a molten tin-zinc bath, so as to ensure the tightness of the batter at least cost and a second layer with a pure tin base deposited by electrodeposition or a second layer comprising an alloy with a silver, palladium and copper base deposited on this first layer of the second stack.

The terminations make it possible to take the alternating positive and negative electrical connections on each one of the ends of the battery. These terminations 40 make it possible to create the electrical connections in parallel between the different elements of the battery. For this, only the cathode connections 50 exit on one end, and the anode connections 50 are available on another end. Advantageously, the anode and cathode connections 50 are on the opposite sides of the stack.

Advantageously, after the step (11) of the method of manufacturing a lithium-ion battery according to the invention:
  is deposited successively, alternating, on the impregnated structure:
    at least one first layer of parylene and/or polymide on said battery,
    at least one second layer composed of an electrically-insulating material by ALD (Atomic Layer Deposition) on said first layer of parylene and or polyimide,
    and on the alternating succession of at least one first and of at least one second layer is deposited a layer making it possible to protect the battery from mechanical damage of the battery, preferably made of silicone, epoxy resin, or polyimide or parylene, thus forming, an encapsulation system of the battery,
  the impregnated structure thus encapsulated is cut along two cutting planes to expose on each one of the cutting plans anode and cathode connections of the battery, in such a way that the encapsulation system covers four of the six faces of said battery, preferably continuously, in such a way as to obtain an elementary battery,
  is deposited successively, on and around, these anode and cathode connections:
    a first electrically-conductive layer, optional, preferably deposited by ALD,
    a second layer with an epoxy resin base charged with silver, deposited on the first electronically-conductive layer, and
    a third layer with a nickel base, deposited on the second layer, and a fourth layer with a tin or copper base, deposited on the third layer.

In another preferred embodiment, a lithium-ion battery is manufactured according to the invention by the method comprising the following steps:
(1) a) Providing a colloidal suspension comprising aggregates or agglomerates of nanoparticles of at least one cathode material with an average primary diameter $D_{50}$ less than or equal to 50 nm;
b) Providing a colloidal suspension comprising aggregates or agglomerates of nanoparticles of at least one anode material with an average primary diameter $D_{50}$ less than or equal to 50 nm;
c) Providing of at least two flat conducting substrates, preferably metal, said conducting substrates can be used as current collectors of the battery,
(2) Deposition of at least one layer of cathode, respectively anode, by dip-coating, by ink-jet, by doctor blade, by roll coating, by curtain coating or by electrophoresis, preferably by pulsed-current galvanostatic electrodeposition, from said suspension of nanoparticles of material provided in step (1), respectively in step (2), on said substrate provided in step (1),
(3) Drying the layer thus obtained in the step (2),
(4) Optionally, deposition by ALD of a layer of electrically-insulating material on and inside pores of the layer of cathode, and/or of anode in step (3),
(5) Deposition, preferably by electrophoresis, by ink-jet, by doctor blade, by roll coating, by curtain coating or by dip-coating, of a film, preferably porous, more preferably mesoporous, of an electrically-insulating material or of an ion-conducting material or of an electrically-insulating material possibly ion-conducting from a colloidal suspension of nanoparticles of this aggregated or agglomerated material of average primary diameter $D_{50}$ less than or equal to 50 nm and of an average diameter $D_{50}$ of about 100 nm on the layer of cathode, respectively anode obtained in step (3) and/or step (4),
(6) Drying the layer thus obtained in the step (5),
(7) Realization of a stack comprising an alternating succession of layers of cathode and anode, preferably offset laterally,
(8) Hot pressing of the layers of anode and cathode obtained in step (7) in such a way as to juxtapose the films obtained in step (6) present on the layers of anode and cathode, and to obtain an assembled stack,
(9) Optionally, deposition by ALD of a layer of electrically-insulating material on and inside pores of the assembled stack.

The order of steps (a1), (1b) and (1c) is not important.

It is preferred to deposit by ALD a layer of electronically-insulating material on the assembled stack obtained in step (8) than to carry out this deposition in step (4); it is simpler to carry out the deposition by ALD of a layer of electronically-insulating material on a thermo-assembled or thermo-compressed stack than to carry it out on each electrode separately.

After step (8) or after step (9) of the method of manufacturing a lithium-ion battery according to the invention:
is deposited successively, alternating, on the assembled stack, an encapsulation system formed by a succession of layers, namely a sequence, preferably z sequences, comprising:
a first covering layer, preferably chosen from parylene, parylene of the F type, polyimide, epoxy resins, silicone, polyamide and/or a mixture of the latter, deposited on the assembled stack,
a second covering layer comprised of an electrically-insulating material, deposited by atomic layer deposition on said first covering layer,
this sequence can be repeated z times with $z \geq 1$,
a last covering layer is deposited in this succession of layers of a material chosen from epoxy resin, polyethylene napthalate (PEN), polyimide, polyamide, polyurethane, silicone, sol-gel silica or organic silica,
the assembled stack this encapsulated is cut along two cutting planes to expose on each one of the cutting plans anode and cathode connections of the assembled stack, in such a way that the encapsulation system covers four of the six faces of said assembled stack, preferably continuously, in such a way as to obtain an elementary battery,
the encapsulated and cut elementary battery is impregnated with a phase carrying lithium ions,
is deposited successively, on and around, these anode and cathode connections:
a first layer of a material charged with graphite, preferably epoxy resin charged with graphite,
a second layer comprising metal copper obtained from an ink charged with nanoparticles of copper deposited on the first layer,
the layers obtained are thermally treated, preferably by infrared flash lamp in such a way as to obtain a covering of the cathode and anode connections by a layer of metal copper,
possibly, is deposited successively, on and around, this first stack of terminations, a second stack comprising:
a first layer of a tin-zinc alloy deposited, preferably by dipping in a molten tin-zinc bath, so as to ensure the tightness of the battery at least cost, and
a second layer with a pure tin base deposited by electrodeposition or a second layer comprising an alloy with a silver, palladium and copper base deposited on this first layer of the second stack.

Advantageously, the anode and cathode connections are on the opposite sides of the stack.

All the embodiments relating to the deposition of the dielectric layer presented in section 5, to the assembly of the battery, to the impregnation of the assembled battery, to the deposition of the encapsulation system and of the terminations described hereinabove can be combined together independently of one another, if this combination is realistic for those skilled in the art.

EXAMPLES

Example 1: Realization of a Mesoporous Cathode with a $LiMn_2O_4$ Base

A suspension of nanoparticles of $LiMn_2O_4$ was prepared by hydrothermal synthesis: 14.85 g of LiOH, $H_2O$ was dissolved in 500 ml of water. To this solution was added 43.1 g of $KMnO_4$ and this liquid phase was poured into an autoclave. Under stirring was added 28 ml of isobutyraldehyde and water until a total volume of 3.54 l was reached. The autoclave was then heated to 180° C. and maintained at this temperature for 6 hours. After slow cooling a black precipitate was obtained in suspension in the solvent. This precipitate was subjected to a succession of centrifugation-redispersion steps in the water, until an aggregated suspension was obtained with a conductivity of about 300 μS/cm and a zeta potential of −30 mV. The size of the primary particles was very homogenous (monodispersed), of about 10 nm to 20 nm, and the aggregates has a size comprised between 100 nm and 200 nm. The product was characterized by diffraction with X-rays and electron microscopy.

These aggregates were deposited by electrophoresis on stainless steel foils (316L) of a thickness of 5 μm, in an aqueous medium, by applying pulsed currents of 0.6 A at peak and 0.2 A on the average; the voltage applied was about 4 to 6 V for 400 s. A deposition of about 4 μm thick was thus obtained. It was dried in a temperature and humidity controlled oven so as to prevent the formation of cracks when drying.

It was consolidated at 600° C. for 1 h in air so as to weld the nanoparticles together, to improve the adherence to the substrate and to prefect the recrystallization of the $LiMn_2O_4$. the layer has an open porosity of about 45% by volume with pores with a size comprised between 10 nm and 20 nm (see hereinbelow, example 5).

In an alternative of this method, a monodispersed colloidal suspension was obtained with a particle size comprised between 20 nm and 30 nm, which was stable, with a zeta potential of about 55 mV. In order to obtain aggregates of a defined size, a solution of LiOH was added to destabilize the suspension, until the obtaining of aggregates of sizes of about 100 nm; the zeta potential of this suspension was then 35 mV, and its conductivity greater than by several hundreds of μS/cm. Using this colloidal suspension a layer of a thickness of 4 μm was deposited by electrophoresis on a stainless steel foil (316L) 5 μm thick. The distance between the electrode and the counter electrodes was about 1 cm, the current density was about 6 mA/cm². The duration of the current pulses was 5 ms, and the time between pulses was 1 ms. The drying and the consolidation were carried out as described hereinabove.

Note that in this example the colloidal suspension naturally includes aggregates, due to the residual ionic charge. If the purification is pushed further, through more steps of centrifugation and/or ultrafiltration techniques, a stable monodispersed suspension is then obtained with a conductivity less than 100 μS/cm. This suspension does not include aggregates, and so that it can be used for the step of electrophoresis it has to be destabilized, by adding LiOH.

Example 2: Realization of a Mesoporous Cathode with a $LiCoO_2$ Base

A suspension of crystalline nanoparticles of $LiCoO_2$ was prepared by hydrothermal synthesis. For 100 ml of suspension, the reaction mixture was carried out by adding 20 ml of an aqueous solution at 0.5M of cobalt nitrate hexahydrate added under stirring in 20 ml of a solution at 3M of lithium hydroxide monohydrate followed by the drop-by-drop addition of 20 ml of $H_2O_2$ at 50%. The reaction mixture was placed in an autoclave at 200° C. for 1 hour; the pressure in the autoclave reached about 15 bars.

A black precipitate was obtained in suspension in the solvent. This precipitate was subjected to a succession of centrifugation-redispersion steps in the water, until a suspension was obtained with a conductivity of about 200 μS/cm and a zeta potential of −30 mV. The size of the primary particles was about 10 nm to 20 nm and the aggregates has a size comprised between 100 nm and 200 nm. The product was characterized by diffraction with X-rays and electron microscopy.

These aggregates were deposited by electrophoresis on stainless steel foils of a thickness of 5 μm, in an aqueous medium, by applying pulsed currents of 0.6 A at peak and 0.2 A on the average; the voltage applied was about 4 to 6 V for 400 s. A deposition of about 4 μm thick was thus obtained. It was consolidated at 600° C. for 1 h in air so as to weld the nanoparticles together, to improve the adherence to the substrate and to prefect the recrystallization of the $LiCoO_2$.

Example 3: Realization of a Mesoporous Anode with a $Li_4Ti_5O_{12}$ Base

A suspension of nanoparticles of $Li_4Ti_5O_{12}$ was prepared by glycothermal synthesis: 190 ml of 1,4-butanediol were poured into a beaker, and 4.25 g of lithium acetate was added under stirring. The solution was maintained under stirring until the acetate was fully dissolved. 16.9 g of titanium butoxide were taken under inert atmosphere and introduced into the acetate solution. The solution was then stirred for a few minutes before being transferred into an autoclave that was filled beforehand with an additional 60 ml of butanediol. The autoclave was then closed and purged of the nitrogen for at least 10 minutes. The autoclave was then heated to 300° C. at a speed of 3° C./min and maintained at this temperature for 2 hours, under stirring. At the end, it was left to cool, still under stirring.

Figure 1B:
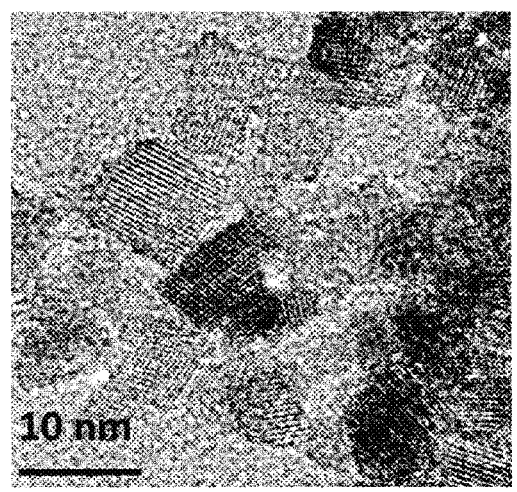
FIGS. 1 and 2 show different aspects of embodiments of the invention, without however limiting the scope thereof.

A white precipitate was obtained in suspension in the solvent. This precipitate was subjected to a succession of centrifugation-redispersion steps in the ethanol in order to obtain a pure colloidal suspension, with a low ionic conductivity. It included aggregates of about 150 nm formed from primary particles of 10 nm. The zeta potential was about −45 mV. The product was characterized by diffraction with X-rays and electron microscopy. FIG. 1(a) shows a diffractogram, FIG. 1(b) a snapshot obtained by transmission electron microscopy of primary nanoparticles These aggregates were deposited by electrophoresis on stainless steel foils of a thickness of 5 μm, in an aqueous medium, by applying pulsed currents of 0.6 A at peak and 0.2 A on the average; the voltage applied was about 3 to 5 V for 500 s. A deposition of about 4 μm thick was thus obtained. It was consolidated by RTA annealing at 40% power for 1 h in nitrogen so as to weld the nanoparticles together, to improve the adherence to the substrate and to prefect the recrystallization of the $Li_4Ti_5O_{12}$.

Example 4: Realization of a Covering by ALD on the Mesoporous Electrodes (Case of a Deposition of Alumina on a Cathode)

A thin layer of alumina was deposited in a ALD P300B reactor (supplier: Picosun), under an argon pressure of 2 mbars at 180° C. Argon is used here as both a carrier gas and for the purge. Before each deposition a drying time of 3 hours was applied. The precursors used were water and TMA (trimethylaluminum). A deposition cycle was constituted of the following steps:
Injection of the TMA for 200 ms
Purge of the chamber with Ar for 6 seconds
Injection of water for 50 ms
Purge of the chamber with Ar for 6 seconds
14 cycles are applied to reach a coating thickness of 1.6 nm. After these various cycles, a vacuum drying at 120° C. for 12 hours was applied to remove the residue of reagents on the surface.

Example 5: Determination of the Specific Surface Area and of the Porous Volume

The specific surface area was determined by the BET technique (Brunauer-Emmett-Teller), known to those skilled in the art, on a layer of LiMn$_2$O$_4$ (abbreviated here as "LMO") obtained by a method similar to that described in example 1 hereinabove. The samples were annealed depositions of LMO of a thickness of 2 μm deposited on each one of the two faces of a stainless steel foil (thickness 5 μm), with a grammage of 0.6 mg/cm$^2$ per face (or 1.2 mg/cm$^2$ on the 2 faces). Two foils of 5×10 cm were laser cut, wound around each other, and inserted into the glass cell of the BET device. The adsorbent gas used for the analysis was N$_2$. The results are as follows:

| | |
|---|---|
| Total mass of the sample (foil + deposition): | 0.512 g |
| Deposition mass (m) | 0.120 g |
| Deposition mass after 5 h in a vacuum at 150° C. | 0.117 g |
| Specific surface area BET (S) | 43.80 m$^2$/g |
| Pore volume (V) | 0.2016 cm$^3$/g |
| Pore diameter (D = 4 V/A) | 20 nm |

The BET method only makes it possible to characterize the open porosity of a diameter less than 50 nm (the pore diameter is calculated by considering that the pores are cylindrical). The estimating of the open porosity of a dimension greater than 50 nm would require the use of other methods (mercury intrusion). It can be noted however that this limit diameter corresponds to the maximum porosity measured in FIB on the depositions of hydrothermal LMO. The specific surface area of the LMO powder obtained by hydrothermal synthesis was 160 m$^2$/g (determined elsewhere).

In the hypothesis where it would be desired to impregnate all of the porosity available in an disk electrode El-Cell of a diameter of 18 mm with an LMO grammage of 0.6 mg/cm$^2$, a volume of electrolyte equal to 2.3 μL would be required. The theoretical density of the LMO, $d_{LMO}$, is equal to 4.29 g/cm$^3$. The porosity corresponds to the empty volume over the total volume occupied by the deposition which gives the following ratio:

porosity =

$$\frac{V_{empty}}{V_{total}} = \frac{V*m}{\frac{m}{d_{LMO}} + V*m} = \frac{V}{\frac{1}{d_{LMO}} + V} = \frac{0.2016}{\frac{1}{4.29} + 0.20161} = 46.4\%$$

The porosity obtained by this calculation (46.4%) is very close to the porosity estimated by measuring the mass of the deposition and its average thickness (40-50%).

It is therefore possible to conclude that the porosity in the LMO layers deposited by the method according to the invention is mostly open porosity.

Example 6: Manufacture of a Battery that Uses the Electrodes According to the Invention Several anodes, respectively cathodes, in thin layers were realized according to example 3, respectively example 2. These electrodes were covered with a porous layer from a suspension of nanoparticles of Li$_3$PO$_4$ as indicated hereinbelow.

a. Realization of a Suspension of Nanoparticles of Li$_3$PO$_4$

Two solutions were prepared:

11.44 g of CH$_3$COOLi, 2H$_2$O were dissolved in 112 ml of water, then 56 ml of water were added under intense stirring to the medium in order to obtain a solution A.

4.0584 g of H$_3$PO$_4$ were diluted in 105.6 ml of water, then 45.6 ml of ethanol were added to this solution in order to obtain a second solution called hereinafter solution B.

Solution B was then added, under intense stirring, to solution A.

The solution obtained, perfectly limpid after the disappearance of bubbles formed during the mixing, was added to 1.2 liters of acetone under the action of a homogenizer of the Ultraturrax™ type in order to homogenize the medium. A white precipitation in suspension in the liquid phase was immediately observed.

The reaction medium was homogenized for 5 minutes then was maintained 10 minutes under magnetic stirring. It was left to decant for 1 to 2 hours. The supernatant was discarded then the remaining suspension was centrifuged 10 minutes at 6000 rpm. Then 300 ml of water was added to put the precipitate back into suspension (use of a sonotrode, magnetic stirring). Under intense stirring, 125 ml of a solution of sodium tripolyphosphate 100 g/l was added to the colloidal suspension thus obtained. The suspension thus became more stable. The suspension was then sonicated using a sonotrode. The suspension was then centrifuged 15 minutes at 8000 rpm. The base was then redispersed in 150 ml of water. Then the suspension obtained was again centrifuged 15 minutes at 8000 rpm and the bases obtained redispersed in 300 ml of ethanol in order to obtain a suspension able to realize an electrophoretic deposition.

Agglomerates of about 100 nm formed from primary particles of Li$_3$PO$_4$ of 10 nm were thus obtained in suspension in the ethanol.

b. Realization on the Previously Developed Anode and Cathode Layers of a Porous Layer from the Suspension of Nanoparticles of Li$_3$PO$_4$ Described Hereinabove in Part a)

Thin porous layers of Li$_3$PO$_4$ were then deposited by electrophoresis on the surface of the previously developed anode and cathode by applying an electric field of 20V/cm to the suspension of nanoparticles of Li$_3$PO$_4$ obtained hereinabove, for 90 seconds in order to obtain a 1.5 μm layer. The layer was then dried in the air at 120° C. then a calcination treatment at 350° C. for 60 minutes was carried out on this layer dried beforehand in order to remove any trace of organic residue.

c. Realization of an Electrochemical Cell

After having deposited 1.5 μm of porous Li$_3$PO$_4$ on the electrode LiCoO$_2$ developed according to example 2 and on the electrode Li$_4$Ti$_5$O$_{12}$ developed according to example 3, the two sub-systems were stacked in such a way that the films of Li$_3$PO$_4$ were in contact. This stack was then vacuum hot pressed.

To do this, the stack was placed under a pressure of 1.5 MPa then vacuum dried for 30 minutes at 10$^{-3}$ bar. The press platens were then heated to 450° C. with a speed of 4° C./seconds. At 450° C., the stack was then thermo-compressed under a pressure of 45 MPa for 1 minute, then the system was cooled to ambient temperature.

Once the assembly is carried out, a rigid, multilayer system formed from an assembled cells was obtained.

This assembly was then impregnated in an electrolytic solution comprising PYR14TFSI and LiTFSI at 0.7 M. The ionic liquid enters instantly by capillarity in the porosities. The system was maintained in immersion for 1 minute, then the surface of the stack of cells was dried by a curtain of N$_2$.

d. Realization of a Battery Comprising Several Electrochemical Cells

Several anodes, respectively cathodes, in thin layers were realized according to example 3, respectively example 2.

These electrodes were covered with a porous layer from a suspension of nanoparticles of $Li_3PO_4$ as indicated hereinbelow.

After having deposited 1.5 μm of porous $Li_3PO_4$ on the each one of the electrodes ($LiCoO_2$ and $Li_4Ti_5O_{12}$) developed beforehand, the two sub-systems were stacked in such a way that the films of $Li_3PO_4$ were in contact. This stack comprising an alternating succession of cathode and anode in thin layers covered with a porous layer and of which the films of $Li_3PO_4$ were in contact, was then vacuum hot pressed.

To do this, the stack was placed under a pressure of 1.5 MPa then vacuum dried for 30 minutes at $10^{-3}$ bar. The press platens were then heated to 450° C. with a speed of 4° C./seconds. At 450° C., the stack was then thermo-compressed under a pressure of 45 MPa for 1 minute, then the system was cooled to ambient temperature.

Once the assembly is carried out, a rigid, multilayer system formed from several assembled cells was obtained.

This assembly was then impregnated in an electrolytic solution comprising PYR14TFSI and LiTFSI at 0.7 M. The ionic liquid enters instantly by capillarity in the porosities. The system was maintained in immersion for 1 minute, then the surface of the stack of cells was dried by a curtain of $N_2$.

A lithium-ion battery comprising several electrochemical cells, each one comprising electrodes according to the invention, was thus obtained.

The invention claimed is:

1. A method for producing a porous ceramic electrode, said porous ceramic electrode comprising a layer deposited on a substrate, said layer being binder-free and having a porosity of more than 30 volume %, and less than 50 volume %, and pores having an average diameter of less than 50 nm, said method comprising the steps of:
   (a) providing a colloidal suspension containing aggregates or agglomerates of nanoparticles of at least one material P having an average primary diameter $D_{50}$ of less than or equal to 80 nm, wherein a distribution of the average primary diameter $D_{50}$ is a monodispersed distribution, said aggregates or agglomerates having an average diameter between 80 nm and 300 nm,
   (b) providing a substrate, wherein the substrate has a melting point above 600° C.,
   (c) depositing a mesoporous electrode layer on said substrate by electrophoresis, by ink-jet, by doctor blade, by roll coating, by curtain coating or by dip-coating, from said colloidal suspension provided in step (a);
   (d) drying the layer obtained in step (c), and
   (e) consolidating the mesoporous electrode layer obtained in step (d) by pressing and/or heating.

2. The method according to claim 1, wherein:
   (a1) the colloidal suspension includes nanoparticles of at least one material P with a primary diameter $D_{50}$ less than or equal to 50 nm;
   (a2) the nanoparticles present in said colloidal suspension are destabilized to form aggregates or agglomerates of particles with an average diameter comprised between 100 nm and 200 nm, said destabilization being done by adding a destabilizing agent such as a salt;
   (b) a substrate is provided;
   (c) a mesoporous electrode layer is deposited on said substrate by electrophoresis, by ink-jet, by doctor blade, by roll coating, by curtain coating or by dip-coating, from said colloidal suspension comprising the aggregates or agglomerates of nanoparticles obtained in step (a2);
   (d) said layer is dried in an air flow; and
   (e) the mesoporous electrode layer is consolidated by pressing and/or heating.

3. The method according to claim 2, wherein the mesoporous electrode layer has a thickness less than 10 μm.

4. The method according to claim 1, wherein the average primary diameter $D_{50}$ of said nanoparticles is between 10 nm and 50 nm.

5. The method according to claim 1, wherein the average diameter of the pores is between 2 nm and 50 nm.

6. The method according to claim 1, wherein the porous ceramic electrode has a porosity between 35 and 50 volume %.

7. The method according to claim 1, wherein said electrode is a cathode, and said material P is chosen from the group consisting of:
   oxides $LiMn_2O_4$, $Li_{1+x}Mn_{2-x}O_4$ with 0<x<0.15, $LiCoO_2$, $LiNiO_2$, $LiMn_{1.5}Ni_{0.5}O_4$, $LiMn_{1.5}Ni_{0.5-x}X_xO_4$ where X is selected from the group consisting of Al, Fe, Cr, Co, Rh, Nd, Sc, Y, Lu, La, Ce, Pr, Pm, Sm, Eu, Gd, Tb, Dy, Ho, Er, Tm, Yb, and where 0<x<0.1, $LiMn_{2-x}M_xO_4$ with M=selected from the group consisting of Er, Dy, Gd, Tb, Yb, Al, Y, Ni, Co, Ti, Sn, As, Mg or a mixture thereof and where 0<x<0.4, $LiFeO_2$, $LiMn_{1/3}Ni_{1/3}Co_{1/3}O_2$, $LiNi_{0.8}Co_{0.15}Al_{0.05}O_2$, $LiAl_xMn_{2-x}O_4$ with 0≤x<0.15, $LiNi_{1/x}Co_{1/y}Mn_{1/z}O_2$ with x+y+z=10;
   phosphates $LiFePO_4$, $LiMnPO_4$, $LiCoPO_4$, $LiNiPO_4$, $Li_3V_2(PO_4)_3$; phosphates of formula $LiMM'PO_4$, with M and M' (M≠M') selected from the group consisting of Fe, Mn, Ni, Co, and V; and
   all lithium forms of the following chalcogenides: $V_2O_5$, $V_3O_8$, $TiS_2$, titanium oxysulfides ($TiO_yS_z$ with z=2-y and 0.3≤y≤1), tungsten oxysulfides ($WO_yS_z$ with 0.6<y<3 and 0.1<z<2), CuS, $CuS_2$, $Li_xV_2O_5$ with 0<x≤2, $Li_xV_3O_8$ with 0<x≤1.7, $Li_xTiS_2$ with 0<x≤1, titanium oxysulfides and lithium oxysulfides $Li_xTiO_yS_z$ with z=2-y, 0.3≤y≤1, $Li_xWO_yS_z$, $Li_xCuS$, $Li_xCuS_2$.

8. The method according to claim 1, wherein said electrode is an anode, and said material P is chosen from the group consisting of:
   carbon nanotubes, graphene, graphite;
   lithium iron phosphate;
   silicon and tin oxynitrides (of typical formula $Si_aSn_bO_yN_z$ with a>0, b>0, a+b≤2, 0<y≤4, 0<z≤3) (also called SiTON), and $SiSn_{0.87}O_{1.2}N_{1.72}$;
   oxynitride-carbides of typical formula $Si_aSn_bC_cO_yN_z$ with a>0, b>0, a+b≤2, 0<c<10, 0<y<24, 0<z<17;
   nitrides of the type $Si_xN_y$, $Sn_xN_y$, $Zn_xN_y$, wherein x is 3 and y is 2 or 4, $Li_{3-x}M_xN$; (with 0≤x≤0.5 for M=Co, 0≤x≤0.6 for M=Ni, 0≤x≤0.3 for M=Cu); $Si_{3-x}M_xN_4$ with M=Co or Fe and 0≤x≤3);
   oxides $SnO_2$, SnO, $Li_2SnO_3$, $SnSiO_3$, $Li_xSiO_y$ (x>=0 and 2>y>0), $Li_4Ti_5O_{12}$, $TiNb_2O_7$, $Co_3O_4$, $SnB_{0.6}P_{0.4}O_{2.9}$ and $TiO_2$; and
   composite oxides $TiNb_2O_7$ comprising between 0% and 10% carbon by weight, wherein carbon is chosen from graphene and carbon nanotubes.

9. The method according to claim 1, wherein after step (d) or step (e), is deposited by atomic layer deposition (ALD) or by chemical solution deposition (CSD), during a step (f) a layer of electrically-insulating material on and inside the pores of the mesoporous layer.

10. The method according to claim 9, wherein the electrically-insulating material is chosen from $Al_2O_3$, $SiO_2$, and $ZrO_2$.

11. The method according to claim 1, wherein after step (d) or after step (e), is deposited by atomic layer deposition (ALD) or by chemical solution deposition (CSD), during a step (f) a layer of ionic conductive material chosen from $Li_3PO_4$, $Li_3BO_3$, and lithium lanthanum zirconium oxide, on and inside the pores of the mesoporous layer.

12. The method according to claim 1, wherein the porous ceramic electrode is used in devices selected from the group consisting of batteries, capacitors, supercapacitors, capacities, resistors, inductors, transistors, and photovoltaic cells.

13. A method of manufacturing a battery comprising a porous ceramic electrode, the method comprising the steps of:
   (1) providing a colloidal suspension comprising aggregates or agglomerates of nanoparticles of at least one cathode material with an average primary diameter $D_{50}$ less than or equal to 80 nm, wherein a distribution of the average primary diameter $D_{50}$ is a monodispersed distribution,
   (2) providing a colloidal suspension comprising aggregates or agglomerates of nanoparticles of at least one anode material with an average primary diameter $D_{50}$ less than or equal to 80 nm, wherein a distribution of the average primary diameter $D_{50}$ is a monodispersed distribution,
   (3) providing at least two flat conducting substrates, said conducting substrates can be used as current collectors of the battery, wherein the substrates have a melting point above 600° C.,
   (4) depositing at least one layer of a cathode and/or anode, by dip-coating, by ink-jet, by doctor blade, by roll coating, by curtain coating or by electrophoresis, from said suspension of nanoparticles of material provided in step (1), or in step (2), on to said substrate provided in step (3),
   (5) drying the layer thus obtained in the step (4),
   (6) optionally depositing by atomic layer deposition (ALD) a layer of electrically-insulating material on and inside pores of the layer of cathode, and/or of anode in step (5),
   (7) depositing a porous film of: a) an electrically-insulating material, b) an ion-conducting material, or c) an electrically-insulating ion-conducting material, from a colloidal suspension of nanoparticles of this aggregated or agglomerated material of average primary diameter $D_{50}$ less than or equal to 50 nm and of an average diameter $D_{50}$ of about 100 nm on the layer of the cathode or anode obtained in step (5) and/or step (6),
   (8) drying the layer thus obtained in the step (7),
   (9) realizing a stack comprising an alternating succession of layers of cathode and/or anode,
   (10) hot pressing the layers of anode and cathode obtained in step (9) in such a way as to juxtapose the films obtained in step (8) on to the layers of anode and/or cathode, to obtain an assembled stack,
   (11) impregnating the assembled stack obtained in step (10) by phase carrying lithium ions leading to an impregnated structure.

14. The method according to claim 13, wherein between steps (10) and (11):
   an encapsulation system is deposited on the assembled stack formed by an alternating succession of layers, namely a sequence, comprising:
      a first covering layer, chosen from parylene, parylene of the F type, polyimide, epoxy resins, silicone, polyamide or any combination thereof, deposited on the assembled stack,
      a second covering layer comprised of an electrically-insulating material, deposited by atomic layer deposition on said first covering layer,
      wherein the sequence is repeated z times when z>1,
      a last covering layer is deposited in this succession of layers of a material chosen from epoxy resin, polyethylene napthalate (PEN), polyimide, polyamide, polyurethane, silicone, sol-gel silica or organic silica,
   the assembled stack in the encapsulation system is cut along two cutting planes to expose on each one of the cutting planes anode and cathode connections of the assembled stack, in such a way that the encapsulation system covers four of six faces of said assembled stack, continuously, in such a way as to obtain an elementary battery,
   and after step (11),
   is deposited successively, on and around, these anode and cathode connections:
      a first layer of a material charged with graphite, or an epoxy resin charged with graphite,
      a second layer comprising metal copper obtained from an ink charged with nanoparticles of copper deposited on the first layer,
   the layers obtained are thermally treated, by infrared flash lamp in such a way as to obtain a covering of the cathode and anode connections by a layer of metal copper,
   is deposited successively, on and around the layer of metal copper:
      a first layer of a tin-zinc alloy deposited, by dipping in a molten tin-zinc bath, to ensure tightness of the battery at minimum cost, and
      a second layer with a pure tin base deposited by electrodeposition or a second layer comprising an alloy with a silver, palladium and copper base deposited on the first layer of a tin-zinc alloy.

15. The method according to claim 14, wherein the anode and cathode connections are on opposite sides of the assembled stack.

16. The method of claim 13, wherein the porous ceramic electrode is produced by:
   (a) providing a colloidal suspension containing aggregates or agglomerates of nanoparticles of at least one material P having an average primary diameter $D_{50}$ of less than or equal to 80 nm, said aggregates or agglomerates having an average diameter comprised between 80 nm and 300 nm,
   (b) providing a substrate,
   (c) depositing a mesoporous electrode layer on said substrate by electrophoresis, by ink-jet, by doctor blade, by roll coating, by curtain coating or by dip-coating, from said colloidal suspension provided in step (a);
   (d) drying the layer obtained in step (c) in an air flow, and
   (e) consolidating the mesoporous electrode layer obtained in step (d) by pressing and/or heating.

17. The method according to claim 16, wherein all of the battery electrodes are porous ceramic electrodes.

* * * * *